(12) United States Patent
Pan et al.

(10) Patent No.: US 12,363,678 B2
(45) Date of Patent: Jul. 15, 2025

(54) METHOD AND APPARATUS FOR PAGING RECEPTION VIA UE-TO-NETWORK RELAY IN A WIRELESS COMMUNICATION SYSTEM

(71) Applicant: ASUS Technology Licensing Inc., Taipei (TW)

(72) Inventors: Li-Te Pan, Taipei (TW); Richard Lee-Chee Kuo, Taipei (TW)

(73) Assignee: Asus Technology Licensing Inc., Taipei (TW)

( * ) Notice: Subject to any disclaimer, the term of this patent is extended or adjusted under 35 U.S.C. 154(b) by 291 days.

(21) Appl. No.: 18/078,512

(22) Filed: Dec. 9, 2022

(65) Prior Publication Data

US 2023/0397163 A1 Dec. 7, 2023

Related U.S. Application Data

(60) Provisional application No. 63/328,530, filed on Apr. 7, 2022, provisional application No. 63/287,756, filed on Dec. 9, 2021.

(51) Int. Cl.
*H04W 68/02* (2009.01)
*H04W 8/00* (2009.01)
*H04W 76/10* (2018.01)

(52) U.S. Cl.
CPC .......... *H04W 68/02* (2013.01); *H04W 8/005* (2013.01); *H04W 76/10* (2018.02)

(58) Field of Classification Search
None
See application file for complete search history.

(56) References Cited

U.S. PATENT DOCUMENTS

2021/0127343 A1* 4/2021 Mladin ................. H04W 76/14
2022/0116841 A1* 4/2022 Tenny ............... H04W 36/0009

* cited by examiner

*Primary Examiner* — Frantz Bataille
(74) *Attorney, Agent, or Firm* — Cooper Legal Group LLC

(57) ABSTRACT

A method and device are disclosed for paging reception via UE-to-Network Relay. In one embodiment, the method includes a UE being enabled to use layer-2 type UE-to-Network (U2N) Relay. The method also includes the UE discovering one or more relay UEs in response to enabling of using layer-2 type U2N Relay. Furthermore, the method includes the UE selecting a relay UE from the one or more relay UEs. In addition, the method includes the UE establishing a layer-2 link with the relay UE. The method also includes the UE receiving paging information for the UE from the relay UE over the layer-2 link.

20 Claims, 19 Drawing Sheets

METHOD AND APPARATUS FOR PAGING RECEPTION VIA UE-TO-NETWORK RELAY IN A WIRELESS COMMUNICATION SYSTEM

CROSS-REFERENCE TO RELATED APPLICATIONS

The present application claims the benefit of U.S. Provisional Patent Application Ser. No. 63/287,756 filed on Dec. 9, 2021 and U.S. Provisional Patent Application Ser. No. 63/328,530 filed on Apr. 7, 2022, the entire disclosures of which are incorporated herein in their entirety by reference.

FIELD

This disclosure generally relates to wireless communication networks, and more particularly, to a method and apparatus for paging reception via User Equipment (UE)-to-Network Relay in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for paging reception via UE-to-Network Relay. In one embodiment, the method includes a UE being enabled to use layer-2 type UE-to-Network (U2N) Relay. The method also includes the UE discovering one or more relay UEs in response to enabling of using layer-2 type U2N Relay. Furthermore, the method includes the UE selecting a relay UE from the one or more relay UEs. In addition, the method includes the UE establishing a layer-2 link with the relay UE. The method also includes the UE receiving paging information for the UE from the relay UE over the layer-2 link.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.331 V16.6.0, "NR; Radio Resource Control (RRC) protocol specification (Release 16)"; TS 23.304 V17.0.0, "Proximity based Services (ProSe) in the 5G System (5GS) (Release 17)"; R2-2111437, "Introduction of Rel-17 Sidelink Relay", MediaTek Inc.; R2-2111490, "Introduction of Rel-17 Sidelink Relay", Huawei, HiSilicon; and TS 38.304 V16.6.0, "NR; User Equipment (UE) procedures in Idle mode and RRC Inactive state (Release 16)". The standards and documents listed above are hereby expressly incorporated by reference in their entirety.

Figure 1:
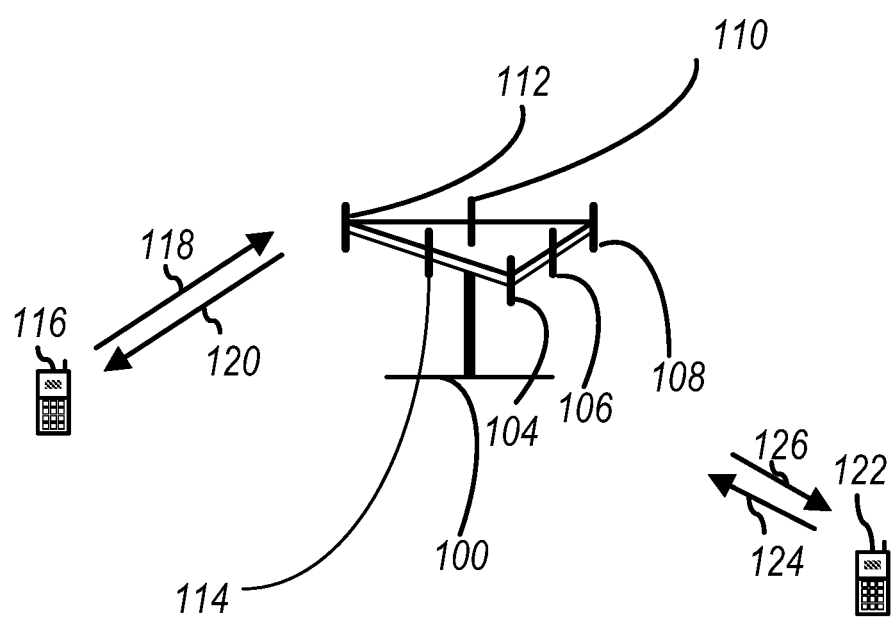
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
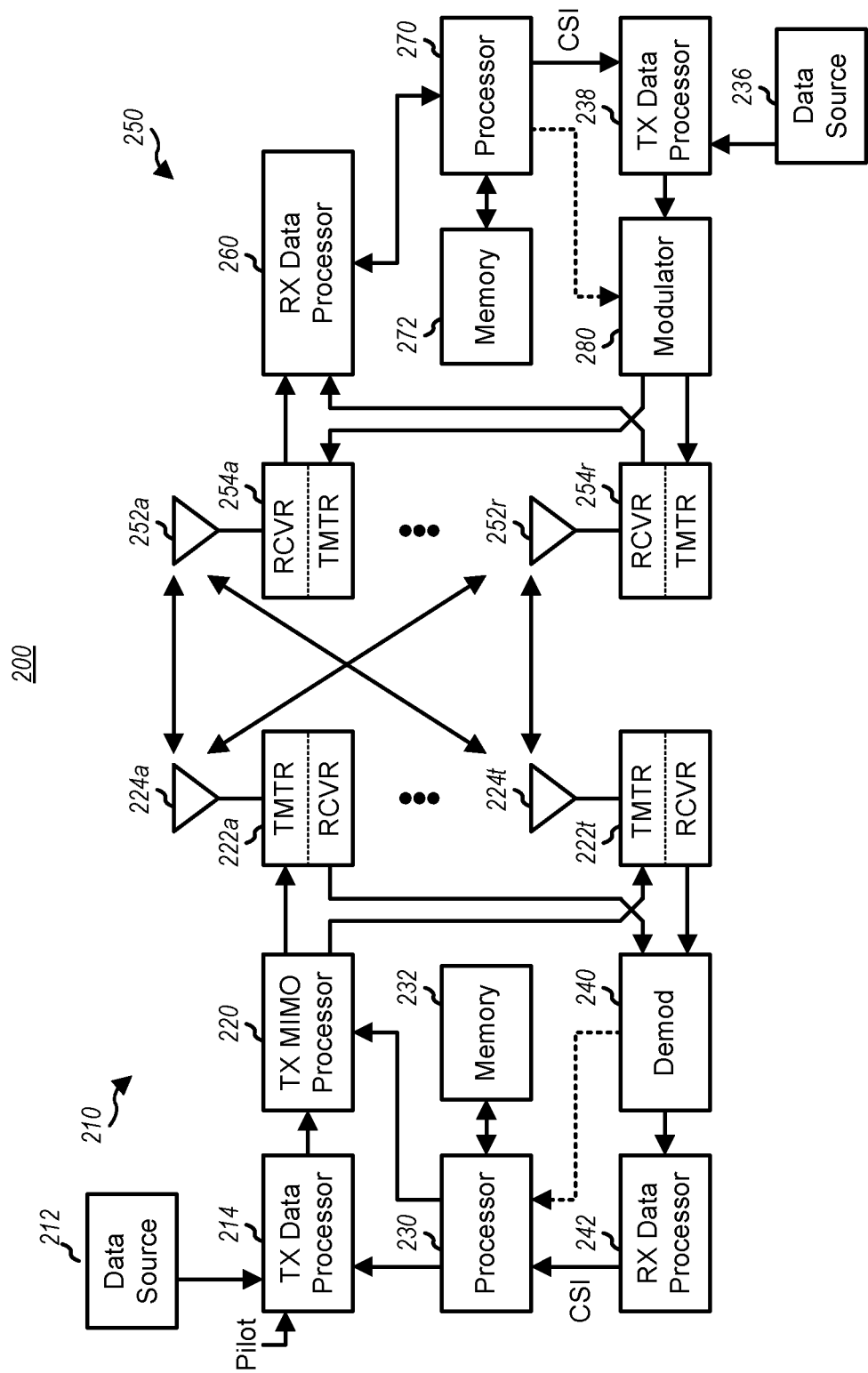
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
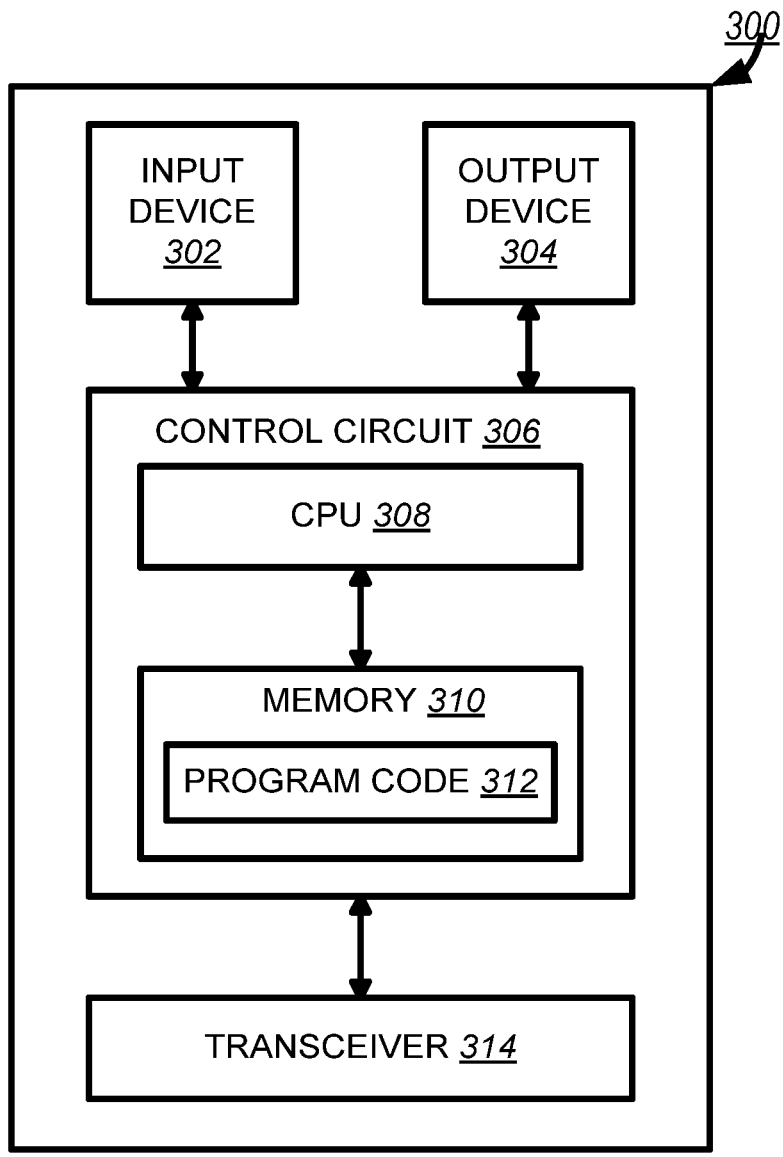
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
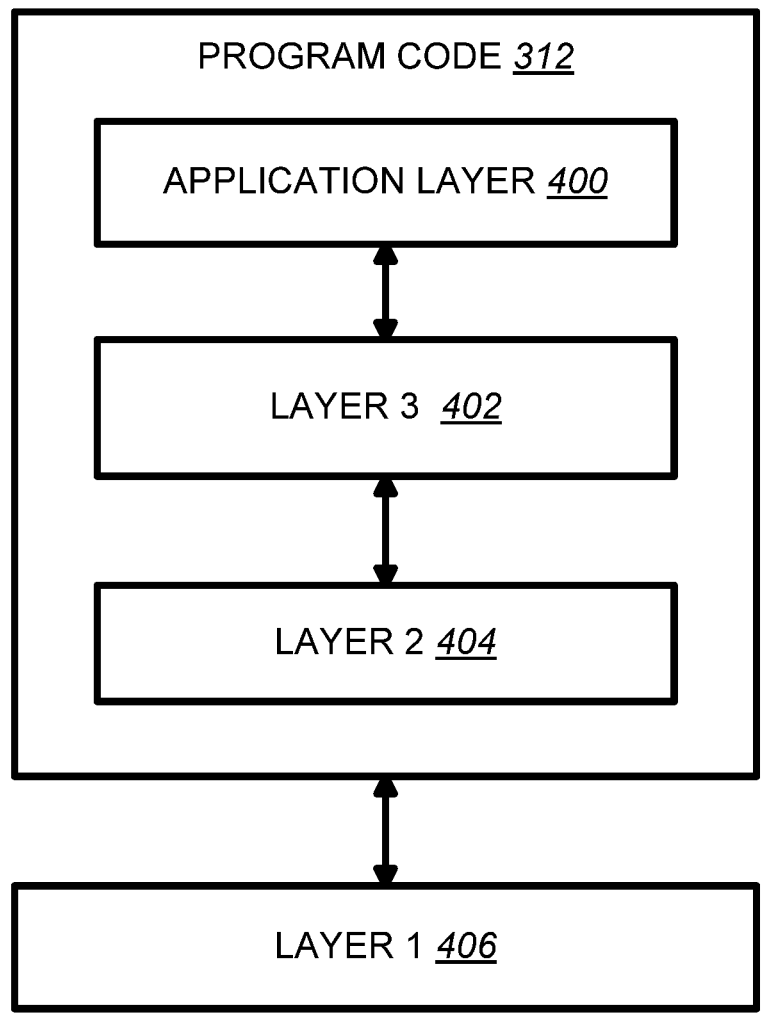
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.331 specifies the paging procedure for NR Release 16 as follows:

5.3.2 Paging 5.3.2.1 General

Figure 5:
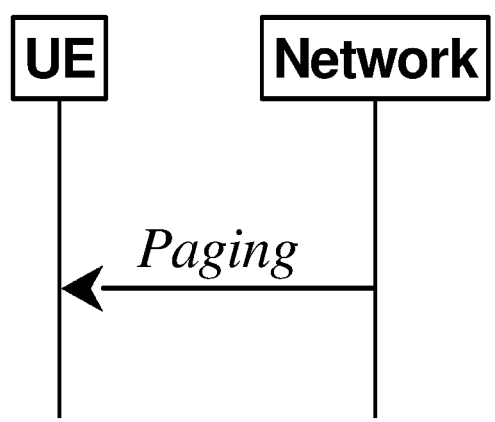
FIG. 5 is a reproduction of FIG. 5.3.2.1-1 of 3GPP TS 38.331 V16.6.0.

[FIG. 5.3.2.1-1 of 3GPP TS 38.331 V16.6.0, entitled "Paging", is reproduced as FIG. 5]

The purpose of this procedure is:
to transmit paging information to a UE in RRC_IDLE or RRC_INACTIVE.

5.3.2.2 Initiation

The network initiates the paging procedure by transmitting the Paging message at the UE's paging occasion as specified in TS 38.304 [20]. The network may address multiple UEs within a Paging message by including one PagingRecord for each UE.

5.3.2.3 Reception of the Paging Message by the UE

Upon receiving the Paging message, the UE shall:
1> if in RRC_IDLE, for each of the PagingRecord, if any, included in the Paging message:
  2> if the ue-Identity included in the PagingRecord matches the UE identity allocated by upper layers:
    3> forward the ue-Identity and accessType (if present) to the upper layers;
1> if in RRC_INACTIVE, for each of the PagingRecord, if any, included in the Paging message:
  2> if the ue-Identity included in the PagingRecord matches the UE's stored full-RNTI:
    3> if the UE is configured by upper layers with Access Identity 1:
      4> initiate the RRC connection resumption procedure according to 5.3.13 with resumeCause set to mps-PriorityAccess;
    3> else if the UE is configured by upper layers with Access Identity 2:
      4> initiate the RRC connection resumption procedure according to 5.3.13 with resumeCause set to mcs-PriorityAccess;
    3> else if the UE is configured by upper layers with one or more Access Identities equal to 11-15:
      4> initiate the RRC connection resumption procedure according to 5.3.13 with resumeCause set to highPriorityAccess;
    3> else:
      4> initiate the RRC connection resumption procedure according to 5.3.13 with resumeCause set to mt-Access;
  2> else if the ue-Identity included in the PagingRecord matches the UE identity allocated by upper layers:
    3> forward the ue-Identity to upper layers and accessType (if present) to the upper layers;
    3> perform the actions upon going to RRC_IDLE as specified in 5.3.11 with release cause 'other'.

3GPP TS 23.304 specifies procedures to support UE-to-Network Relay for NR Release 17 as follows:

4.2.7 5G ProSe UE-to-Network Relay reference architecture

[ . . . ]

4.2.7.2 5G ProSe Layer-2 UE-to-Network Relay reference architecture

FIG. 4.2.7.2-1 show the 5G ProSe Layer-2 UE-to-Network Relay reference architecture. The 5G ProSe Layer-2 Remote UE and 5G ProSe Layer-2 UE-to-Network Relay may be served by the same or different PLMNs. If the serving PLMNs of the 5G ProSe Layer-2 Remote UE and the 5G ProSe Layer-2UE-to-Network Relay are different then NG-RAN is shared by the serving PLMNs, see the 5G MOCN architecture in clause 5.18 of TS 23.501 [4].

Figure 6:
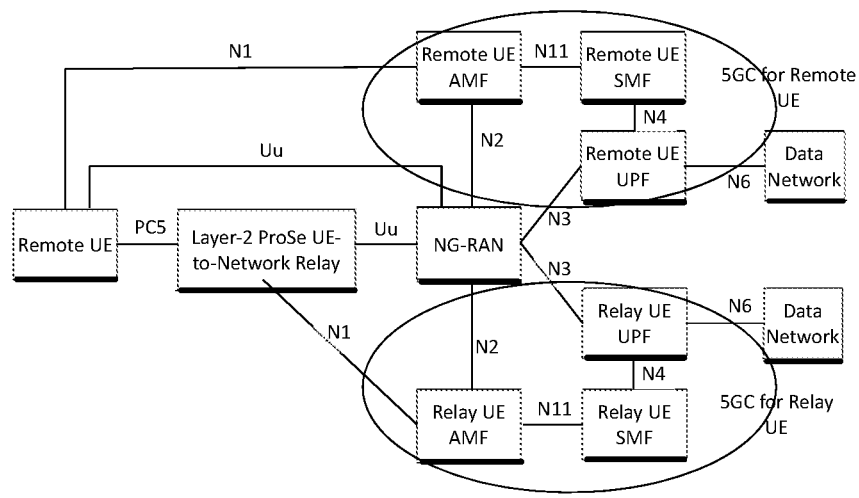
FIG. 6 is a reproduction of FIG. 4.2.7.2-1 of 3GPP TS 23.304 V17.0.0.

[FIG. 4.2.7.2-1 of 3GPP TS 23.304 V17.0.0, entitled "5G ProSe Layer-2 UE-to-Network Relay reference architecture", is reproduced as FIG. 6]

NOTE 1: Uu between the 5G ProSe Layer-2 Remote UE and NG-RAN consists of RRC, SDAP and PDCP.

NOTE 2: The 5G ProSe Layer-2 Remote UE and 5G ProSe Layer-2 UE-to-Network Relay are served by the same NG-RAN. The Core Network entities (e.g., AMF, SMF, UPF) serving the 5G ProSe Layer-2 Remote UE and the 5G ProSe Layer-2 UE-to-Network Relay can be the same or different.

[ . . . ]

4.3.9 5G ProSe UE-to-Network Relay 4.3.9.1 General

Both 5G ProSe Layer-2 and Layer-3 UE-to-Network Relay entity provides the relaying functionality to support connectivity to the network for 5G ProSe Remote UEs. It can be used for both public safety services and commercial services (e.g. interactive service).

Both 5G ProSe Layer-2 and Layer-3 UE-to-Network Relay supports the following functions to enable connectivity to the network:

5G ProSe UE-to-Network Relay Discovery service as defined in clause 6.3.2.3, to allow discovery by the 5G ProSe Remote UE;

access the 5GS as a UE as defined in TS 23.501 [4] with the enhancements as specified in clauses 6.2 and 6.6;

relays unicast traffic (uplink and downlink) between the 5G ProSe Remote UE and the network, supporting IP, Ethernet or Unstructured traffic type.

NOTE: Relaying MBS traffic to a 5G ProSe Remote UE by a 5G ProSe UE-to-Network Relay is not supported in this release of the specification.

4.3.9.2 5G ProSe Layer-3 UE-to-Network Relay

In addition to the common 5G ProSe UE-to-Network Relay functions defined in clause 4.3.9.1, 5G ProSe Layer-3 UE-to-Network Relay supports the following functions to enable connectivity to the network:

5G ProSe Direct Communication via 5G ProSe Layer-3 UE-to-Network Relay as specified in clause 6.5.1, for the communication with the 5G ProSe Layer-3 Remote UEs for the relay operations;

end-to-end QoS treatment for the 5G ProSe Layer-3 Remote UE's traffic without N3IWF as defined in clause 5.6.2.1 and when accessing via an N3IWF clause 5.6.2.2;

IP address management for the 5G ProSe Layer-3 Remote UE as defined in clause 5.5.1.3 in case the 5G ProSe Layer-3 Remote UE uses IP traffic type.

4.3.9.3 5G ProSe Layer-2 UE-to-Network Relay

In addition to the common 5G ProSe UE-to-Network Relay functions defined in clause 4.3.9.1, 5G ProSe Layer-2 UE-to-Network Relay supports the following functions to enable connectivity to the network:

5G ProSe Direct Communication via 5G ProSe Layer-2 UE-to-Network Relay as specified in clause 6.5.2, for the communication with the 5G ProSe Layer-2 Remote UEs for the relay operations, including end-to-end QoS treatment.

QoS handling for 5G ProSe Layer-2 UE-to-Network Relay as defined in clause 5.6.2.3.

[ . . . ]

5.1.4.1 Policy/Parameter provisioning for 5G ProSe UE-to-Network Relay

The following information is provisioned in the UE in support of the UE assuming the role of a 5G ProSe UE-to-Network Relay:

1) Authorisation policy for acting as a 5G ProSe Layer-3 and/or Layer-2 UE-to-Network Relay when "served by NG-RAN":
   PLMNs in which the UE is authorized to relay traffic for 5G ProSe Layer-3 and/or Layer-2 Remote UEs.

2) ProSe Relay Discovery policy/parameters for 5G ProSe UE-to-Network Relay:
   Includes the parameters that enable the UE to perform 5G ProSe UE-to-Network Relay Discovery when provided by PCF or provisioned in the ME or configured in the UICC:
   5G ProSe UE-to-Network Relay Discovery parameters (User Info ID, Relay Service Code(s), UE-to-Network Relay Layer Indicator(s)); the UE-to-Network Relay Layer Indicator indicates whether a particular RSC is offering 5G ProSe Layer-2 or Layer-3 UE-to-Network Relay service.
   Default Destination Layer-2 ID(s) for sending and receiving initial signaling of discovery messages;
   For 5G ProSe Layer 3 UE-to-Network Relay, the PDU Session parameters (PDU Session type, DNN, SSC Mode, S-NSSAI, Access Type Preference) to be used for the relayed traffic for each ProSe Relay Service Code;
   Includes security related content for 5G ProSe Relay UE-to-Network Discovery for each ProSe Relay Service Code.
   Editor's note: Whether the security parameters can be provided by the PCF and details of security parameters will be determined by SA3 WG.
   NOTE 1: 5G ProSe Relay Discovery policy/parameters can be provided from ProSe Application Server to the 5G ProSe UE-to-Network Relay.

3) For 5G ProSe Layer 3 UE-to-Network Relay, QoS mapping(s):
   Each QoS mapping entry includes:
   a mapping between a 5QI value and a PQI value;
   a PQI PDB adjustment factor, for the PC5 communication for the 5G ProSe Layer-3 UE-to-Network Relay operation;
   optional the Relay Service Code(s) associates with the QoS mapping entry.

4) For 5G ProSe Layer 3 UE-to-Network Relay to relay Ethernet or Unstructured traffic from 5G ProSe Layer-3 Remote UE by using IP type PDU Session,
   Mapping of ProSe Service(s) to ProSe Application Server address information (consisting of IP address/FQDN and transport layer port number).

The following information is provisioned in the UE in support of the UE assuming the role of a 5G ProSe Remote UE and thereby enabling the use of a 5G ProSe UE-to-Network Relay:

1) Authorisation policy for using a 5G ProSe Layer-3 and/or Layer-2 UE-to-Network Relay:
   Indicates whether the UE is authorised to use a 5G ProSe Layer-3 and/or Layer-2 UE-to-Network Relay.

2) Policy/parameters for 5G ProSe UE-to-Network Relay Discovery:
   Includes the parameters for 5G ProSe Relay Discovery and for enabling the UE to connect to the 5G ProSe UE-to-Network Relay after discovery when provided by PCF or provisioned in the ME or configured in the UICC:
   5G ProSe UE-to-Network Relay Discovery parameters (User Info ID, Relay Service Code(s), UE-to-Network Relay Layer indicator(s)); the UE-to-Network Relay Layer Indicator indicates whether a particular RSC is offering 5G ProSe Layer-2 or Layer-3 UE-to-Network Relay service.
   Default Destination Layer-2 ID(s) for sending and receiving initial signaling of discovery messages;
   For 5G ProSe Layer-3 UE-to-Network Relay, the PDU Session parameters (PDU Session type, DNN, SSC Mode, S-NSSAI, Access Type Preference) to be used for the relayed traffic without using N3IWF access, or an indication of N3IWF access, for each ProSe Relay Service Code;
   Includes security related content for 5G ProSe UE-to-Network Relay Discovery for each ProSe Relay Service Codes.

3) Policy/parameters for N3IWF selection for 5G ProSe Layer-3 Remote UE:
   N3IWF identifier configuration for 5G ProSe Layer-3 Remote UE (either FQDN or IP address) in the HPLMN.
   5G ProSe Layer-3 UE-to-Network Relay access node selection information—a prioritized list of PLMNs for N3IWF selection. It also indicates if selection of an N3IWF in a PLMN should be based on Tracking Area Identity FQDN or on Operator Identifier FQDN.
   Editor's note: Whether the security parameters can be provided by the PCF and details of security parameters will be determined by SA3 WG.
   NOTE 2: ProSe Relay Discovery policy/parameters can be provided from ProSe Application Server to the 5G ProSe Remote UE.

The following information is provisioned in the UE in support of the UE assuming the role of a 5G ProSe UE-to-Network Relay as well as in the UE in support of the UE assuming the role of a 5G ProSe Remote UE and thereby enabling the use of a 5G ProSe UE-to-Network Relay:

1) Radio parameters for 5G ProSe UE-to-Network Relay Discovery when the UE is not "served by NG-RAN":
   Includes the radio parameters NR PC5 with Geographical Area(s) and an indication of whether they are "operator managed" or "non-operator managed". The UE uses the radio parameters to perform 5G ProSe Direct Discovery over PC5 reference point when "not served by NG-RAN" only if the UE can reliably locate itself in the corresponding Geographical Area. Otherwise, the UE is not authorized to transmit.

2) Radio parameters for 5G ProSe Relay UE-to-Network Communication when the UE is not "served by NG-RAN":
   Includes the radio parameters NR PC5 with Geographical Area(s) and an indication of whether they are "operator managed" or "non-operator managed". The UE uses the radio parameters to perform 5G ProSe Direct Communication over PC5 reference point when "not served by NG-RAN" only if the UE can reliably locate itself in the corresponding Geographical Area. Otherwise, the UE is not authorized to transmit.

[ . . . ]

5.8.3 Identifiers for 5G ProSe UE-to-Network Relay 5.8.3.1 Common identifiers for 5G ProSe UE-to-Network Relay The following parameters are used for the 5G ProSe UE-to-Network Relay Discovery Announcement message (Model A), where Source Layer-2 ID and Destination Layer-2 ID are used for sending and receiving the message, and Announcer Info and Relay Service Code are contained in the message:

Source Layer-2 ID: the 5G ProSe UE-to-Network Relay self-selects a Source Layer-2 ID for 5G ProSe UE-to-Network Relay Discovery.

Destination Layer-2 ID: the Destination Layer-2 ID for 5G ProSe UE-to-Network Relay Discovery is selected based on the configuration as described in clause 5.1.4.1.

Announcer Info: provides information about the announcing user.

Relay Service Code: parameter identifying a connectivity service the 5G ProSe UE-to-Network Relay provides to a 5G ProSe Remote UE. The Relay Service Codes are configured in a 5G ProSe UE-to-Network Relay for advertisement. Additionally, the Relay Service Code may also identifies authorized users the 5G ProSe UE-to-Network Relay would offer service to, and may be used to select the related security policies or information e.g. necessary for authentication and authorization between the 5G ProSe Remote UE and the 5G ProSe UE-to-Network Relay (e.g. a Relay Service Code for relays for police members only would be different than a Relay Service Code for relays for Fire Fighters only, even though potentially they provided connectivity to same DN e.g. to support Internet Access).

The following parameters are used for the 5G ProSe UE-to-Network Relay Discovery Solicitation message (Model B), where Source Layer-2 ID and Destination Layer-2 ID are used for sending and receiving the message, and Discoverer Info and Relay Service Code are contained in the message:

Source Layer-2 ID: the 5G ProSe Remote-UE self-selects a Source Layer-2 ID for 5G ProSe UE-to-Network Relay Discovery.

Destination Layer-2 ID: the Destination Layer-2 ID for 5G ProSe UE-to-Network Relay Discovery is selected based on the configuration as described in clause 5.1.4.1.

Discoverer Info: provides information about the discoverer user.

Relay Service Code: information about connectivity that the discoverer UE is interested in. The Relay Service Codes are configured in the 5G ProSe Remote UEs interested in related connectivity services.

The following parameters are used in the 5G ProSe UE-to-Network Relay Discovery Response message (Model B), where Source Layer-2 ID and Destination Layer-2 ID are used for sending and receiving the message, and Discoveree Info and Relay Service Code are contained in the message:

Source Layer-2 ID: the 5G ProSe UE-to-Network Relay self-selects a Source Layer-2 ID for 5G ProSe UE-to-Network Relay Discovery.

Destination Layer-2 ID: set to the Source Layer-2 ID of the received 5G ProSe UE-to-Network Relay Discovery Solicitation message.

Relay Service Code: identifies the connectivity service the 5G ProSe UE-to-Network Relay provides to 5G ProSe Remote UEs that matches the Relay Service Code from the corresponding Discovery Solicitation message.

Discoveree Info: provides information about the discoveree.

[ . . . ]

6.3.2.3 5G ProSe UE-to-Network Relay Discovery 6.3.2.3.1 General

5G ProSe UE-to-Network Relay Discovery is applicable to both 5G ProSe Layer-3 and Layer-2 UE-to-Network relay discovery for public safety use and commercial services. To perform 5G ProSe UE-to-Network Relay Discovery, the 5G ProSe Remote UE and the 5G ProSe UE-to-Network Relay are pre-configured or provisioned with the related information as described in clause 5.1. In 5G ProSe UE-to-Network Relay Discovery, the UEs use pre-configured or provisioned information for the relay discovery procedures as defined in clause 5.1.4.1.

The Relay Service Code (RSC) is used in the 5G ProSe UE-to-Network Relay discovery, to indicate the connectivity service the 5G ProSe UE-to-Network Relay provides to the 5G ProSe Remote UE. The RSCs are configured on the 5G ProSe UE-to-Network Relay and the 5G ProSe Remote UE as defined in clause 5.1.4. The 5G ProSe UE-to-Network Relay and the 5G ProSe Remote UE are aware of whether a RSC is offering 5G ProSe Layer-2 or Layer-3 UE-to-Network Relay service based the policy as specified in clause 5.1.4. A 5G ProSe UE-to-Network Relay supporting multiple RSCs can advertise the RSCs using multiple discovery messages, with one RSC per discovery message.

Additional information used for the 5G ProSe UE-to-Network Relay (re)selection and connection maintenance can be advertised using a separate discovery messages of type "Relay Discovery Additional Information". This may include for example the related system information of the 5G ProSe UE-to-Network Relay's serving cell, as defined in TS 38.300 [12].

Both Model A and Model B discovery are supported:
Model A uses a single discovery protocol message (Announcement).
Model B uses two discovery protocol messages (Solicitation and Response).

For Relay Discovery Additional Information, only Model A discovery is used.

6.3.2.3.2 Procedure for 5G ProSe UE-to-Network Relay Discovery with Model A

Depicted in FIG. 6.3.2.3.2-1 is the procedure for 5G ProSe UE-to-Network Discovery with Model A.

Figure 7:
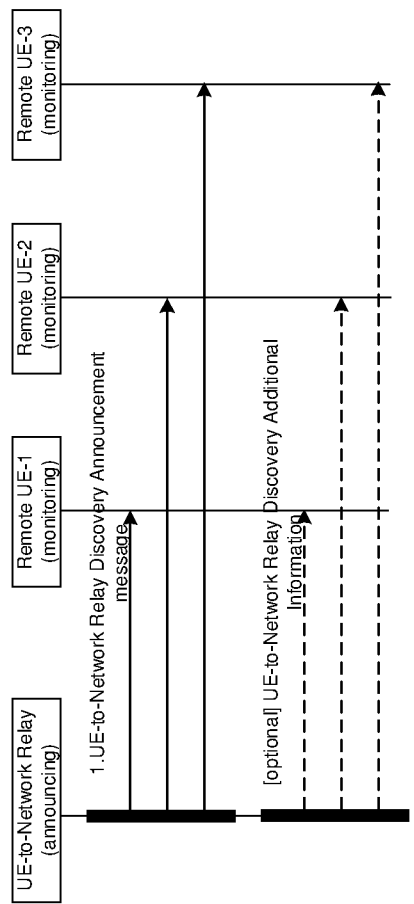
FIG. 7 is a reproduction of FIG. 6.3.2.3.2-1 of 3GPP TS 23.304 V17.0.0.

[FIG. 6.3.2.3.2-1 of 3GPP TS 23.304 V17.0.0, entitled "5G ProSe UE-to-Network Relay Discovery with Model A", is reproduced as FIG. 7]

1. The 5G ProSe UE-to-Network Relay sends a UE-to-Network Relay Discovery Announcement message. The UE-to-Network Relay Discovery Announcement message contains the Type of Discovery Message, Announcer Info and RSC, and is sent using the Source Layer-2 ID and Destination Layer-2 ID as described in clause 5.8.3.

For 5G ProSe Layer-3 UE-to-Network Relay, the 5G ProSe Layer-3 UE-to-Network Relay shall only include a RSC in the UE-to-Network Relay Discovery Announcement when the S-NSSAI associated with that RSC belongs to the Allowed NSSAI of the UE-to-Network Relay.

The 5G ProSe Remote UE (1 to 3) determines the Destination Layer-2 ID for signalling reception. The Destination Layer-2 ID is configured with the UE(s) as specified in clause 5.1.4.1.

5G ProSe Remote UE (1 to 3) monitors announcement messages with the 5G ProSe UE-to-Network RSC corresponding to the desired services.

Optionally, the 5G ProSe UE-to-Network Relay may also send UE-to-Network Relay Discovery Additional Information messages. The parameters contained in this message are described in clause 5.8.3.

The 5G ProSe Remote UE selects the 5G ProSe UE-to-Network Relay based on the information received in step 1.

NOTE: Access Stratum layer information used for 5G ProSe UE-to-Network Relay selection is specified in RAN specifications.

6.3.2.3.3 Procedure for 5G ProSe UE-to-Network Relay Discovery with Model B

Depicted in FIG. 6.3.2.3.3-1 is the procedure for 5G ProSe UE-to-Network Relay Discovery with Model B.

Figure 8:
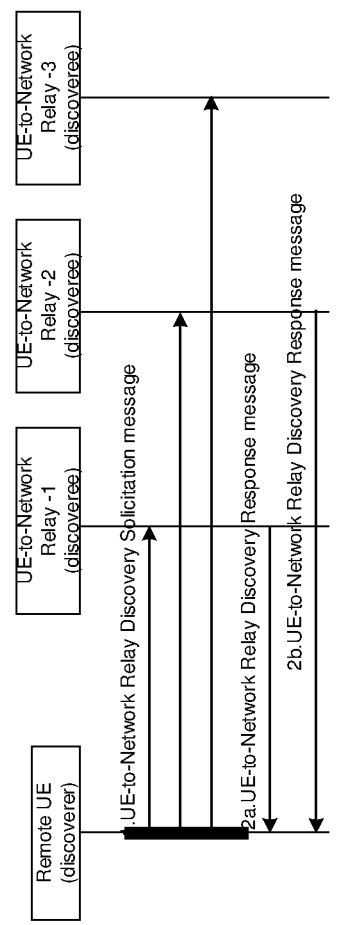
FIG. 8 is a reproduction of FIG. 6.3.2.3.3-1 of 3GPP TS 23.304 V17.0.0.

[FIG. 6.3.2.3.3-1 of 3GPP TS 23.304 V17.0.0, entitled "5G ProSe UE-to-Network Relay Discovery with Model B", is reproduced as FIG. 8]

1. The 5G ProSe Remote UE sends a 5G ProSe UE-to-Network Relay Discovery Solicitation message. The 5G ProSe UE-to-Network Discovery Solicitation message contains the Type of Discovery Message, Discoverer Info and RSC, and is send using the Source Layer-2 ID and Destination Layer-2 ID as described in clause 5.8.3. The 5G ProSe Remote UE discovering a 5G ProSe UE-to-Network Relay sends a solicitation message with the RSC which is associated to the desired connectivity service. The RSC is based on the Policy/Parameters specified in clause 5.1.4.1.

How the 5G ProSe UE-to-Network Relays (1 to 3) determine the Destination Layer-2 ID for signalling reception is specified in clause 5.8.3. The Destination Layer-2 ID is configured with the UE(s) as specified in clause 5.1.4.1.

2. The 5G ProSe UE-to-Network Relays (1 and 2) that match the values of the RSC contained in the solicitation message respond to the 5G ProSe Remote UE with a UE-to-Network Relay Discovery Response message. The 5G ProSe UE-to-Network Relay Discovery Response message contains the Type of Discovery Message, Discoveree Info and RSC, and is sent using the Source Layer-2 ID and Destination Layer-2 ID as described in clause 5.8.3.

For 5G ProSe Layer-3 UE-to-Network Relay, the 5G ProSe UE-to-Network Relay shall only respond to a matching RSC in the UE-to-Network Relay Discovery Solicitation message when the S-NSSAI associated with that RSC belongs to the Allowed NSSAI of the 5G ProSe UE-to-Network Relay.

The 5G ProSe Remote UE selects the 5G ProSe UE-to-Network Relay based on the information received in step 2.

6.4 5G ProSe Direct Communication

[ . . . ]

6.4.3 Unicast Mode 5G ProSe Direct Communication 6.4.3.1 Layer-2 Link Establishment Over PC5 Reference Point To perform unicast mode of ProSe Direct communication over PC5 reference point, the UE is configured with the related information as described in clause 5.1.3.

FIG. 6.4.3.1-1 shows the layer-2 link establishment procedure for the unicast mode of ProSe Direct communication over PC5 reference point.

Figure 9:
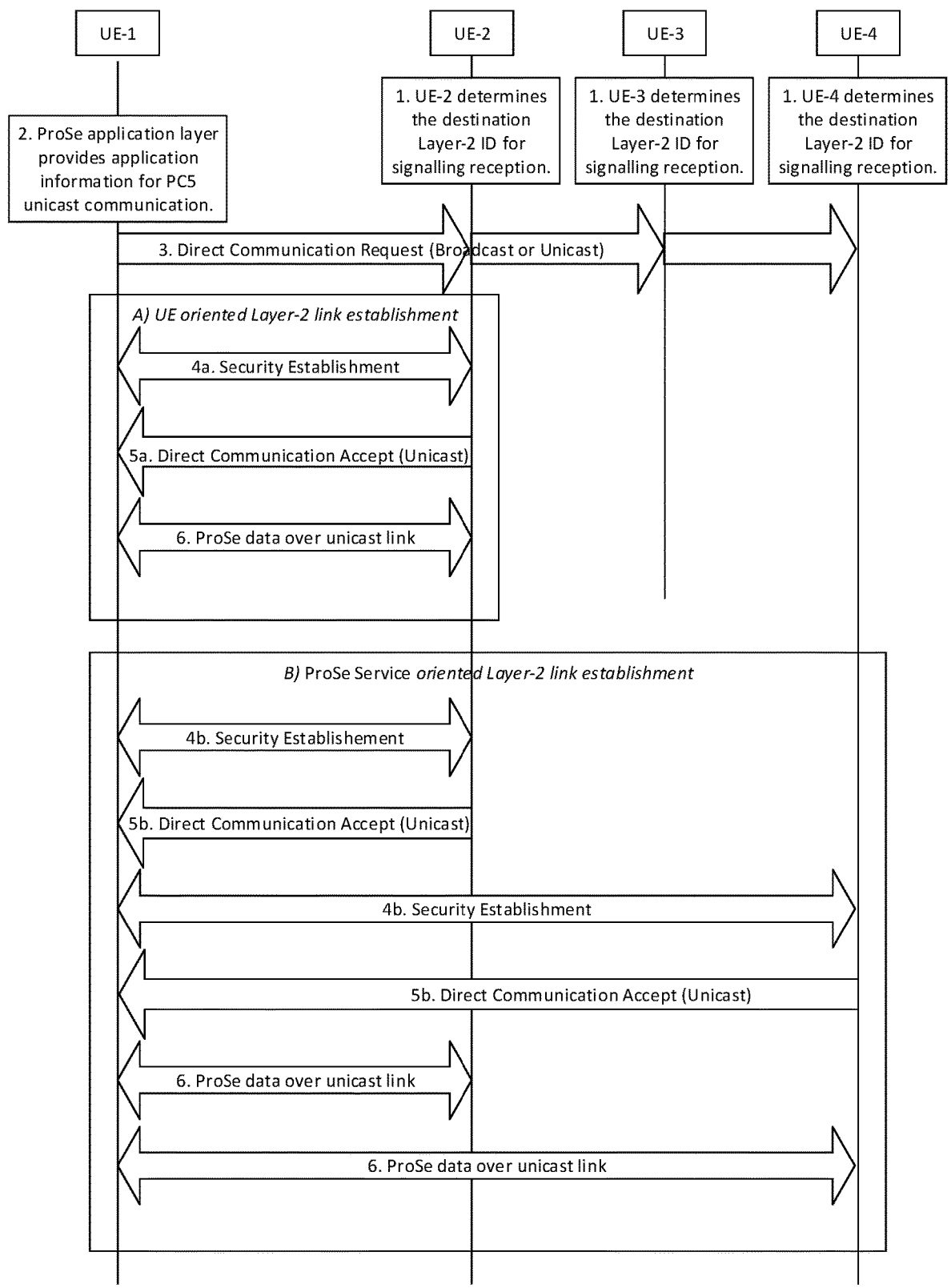
FIG. 9 is a reproduction of FIG. 6.4.3.1-1 of 3GPP TS 23.304 V17.0.0.

[FIG. 6.4.3.1-1 of 3GPP TS 23.304 V17.0.0, entitled "Layer-2 link establishment procedure", is reproduced as FIG. 9]

1. The UE(s) determine the destination Layer-2 ID for signalling reception for PC5 unicast link establishment as specified in clause 5.8.2.4.

2. The ProSe application layer in UE-1 provides application information for PC5 unicast communication. The application information includes the ProSe Service Info, UE's Application Layer ID. The target UE's Application Layer ID may be included in the application information.

The ProSe application layer in UE-1 may provide ProSe Application Requirements for this unicast communication. UE-1 determines the PC5 QoS parameters and PFI as specified in clause 5.6.1.

If UE-1 decides to reuse the existing PC5 unicast link as specified in clause 5.3.4, the UE triggers the Layer-2 link modification procedure as specified in clause 6.4.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the ProSe application layer provided the target UE's Application Layer ID in step 2, the following information is included:

Target User Info: the target UE's Application Layer ID (i.e. UE-2's Application Layer ID).

ProSe Service Info: the information about the ProSe identifier(s) requesting Layer-2 link establishment.

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced ProSe Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:

IP Address Configuration: For IP communication, IP address configuration is required for this link and indicates one of the following values:

"DHCPv4 server" if only IPv4 address allocation mechanism is supported by the initiating UE, i.e., acting as a DHCPv4 server; or "IPv6 Router" if only IPv6 address allocation mechanism is supported by the initiating UE, i.e., acting as an IPv6 Router; or "DHCPv4 server & IPv6 Router" if both IPv4 and IPv6 address allocation mechanism are supported by the initiating UE; or "address allocation not supported" if neither IPv4 nor IPv6 address allocation mechanism is supported by the initiating UE.

Link-Local IPv6 Address: a link-local IPv6 address formed locally based on RFC 4862 [17] if UE-1 does not support the IPv6 IP address allocation mechanism, i.e. the IP Address Configuration indicates "address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.) and the associated ProSe identifier(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.3.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc) and the associated ProSe identifiers(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPv6 address allocation mechanism is supported by the target UE, i.e., acting as an IPv6 Router; or "DHCPv4 server & IPv6 Router" if both IPv4 and IPv6 address allocation mechanism are supported by the target UE; or "address allocation not supported" if neither IPv4 nor IPv6 address allocation mechanism is supported by the target UE.

Link-Local IPv6 Address: a link-local IPv6 address formed locally based on RFC 4862 [17] if the target UE does not support the IPv6 IP address allocation mechanism, i.e. the IP Address Configuration indicates "address allocation not supported", and UE-1 included a link-local IPv6 address in the Direct Communication Request message. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. ProSe data is transmitted over the established unicast link as below:

The PC5 Link Identifier and PFI are provided to the AS layer, together with the ProSe data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer.

UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

[ . . . ]

6.4.3.3 Layer-2 Link Release Over PC5 Reference Point

FIG. 6.4.3.3-1 shows the layer-2 link release procedure over PC5 reference point.

Figure 10:
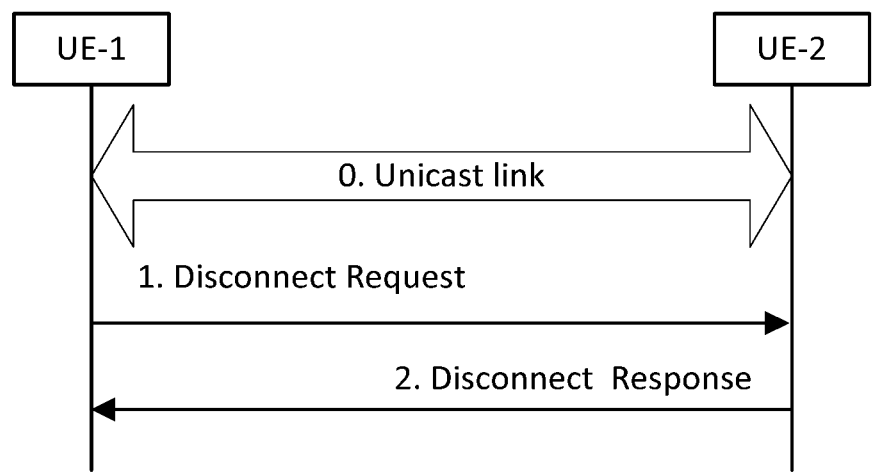
FIG. 10 is a reproduction of FIG. 6.4.3.3-1 of 3GPP TS 23.304 V17.0.0.

[FIG. 6.4.3.3-1 of 3GPP TS 23.304 V17.0.0, entitled "Layer-2 link release procedure", is reproduced as FIG. 10]

0. UE-1 and UE-2 have a unicast link established as described in clause 6.4.3.1.

1. UE-1 sends a Disconnect Request message to UE-2 in order to release the layer-2 link and deletes all context data associated with the layer-2 link. The Disconnect Request message includes Security Information.

2. Upon reception of the Disconnect Request message, UE-2 shall respond with a Disconnect Response message and deletes all context data associated with the layer-2 link. The Disconnect Response message includes Security Information.

The ProSe layer of each UE informs the AS layer that the unicast link has been released. The ProSe layer uses PC5 Link Identifier to indicate the released unicast link. This enables the AS layer to delete the context related to the released unicast link.

NOTE: The Security Information in the above messages is defined in TS 33.YYY [TBD].

[ . . . ]

6.4.3.6 Layer-2 Link Management Over PC5 Reference Point for 5G ProSe UE-to-Network Relay The Layer-2 link procedures over PC5 reference point for unicast mode 5G ProSe Direct Communication as depicted from clause 6.4.3.1 to clause 6.4.3.5 can be used for the PC5 reference point between 5G ProSe Remote UE and 5G ProSe UE-to-Network Relay, with the following differences and clarifications:

The Layer-2 link modification procedure is applicable to ProSe Communication via 5G ProSe Layer-3 UE-to-Network Relay, other procedures are applicable to both ProSe Communication via 5G ProSe Layer-2 UE-to-Network Relay and ProSe Communication via 5G ProSe Layer-3 UE-to-Network Relay.

Editor's note: Whether the Layer-2 link modification procedure is also applicable to ProSe Communication via 5G ProSe Layer-2 UE-to-Network Relay requires cooperation with RAN2.

The UE oriented Layer-2 link establishment is used with UE-1 representing the 5G ProSe Remote UE and UE-2 representing the 5G ProSe UE-to-Network Relay. For other procedures either UE-1 represents the 5G ProSe Remote UE and UE-2 represents the 5G ProSe UE-to-Network Relay, or UE-1 represents the 5G ProSe UE-to-Network Relay and UE-2 represents the 5G ProSe Remote UE. I.e. the Layer-2 link establishment is initiated by the 5G ProSe Remote UE, while other procedures may be initiated either by the 5G ProSe Remote UE or by the 5G ProSe UE-to-Network Relay.

For the UE oriented Layer-2 link establishment as described in the clause 6.4.3.1, In step 1, the 5G ProSe Remote UE determines the destination Layer-2 ID for PC5 unicast link establishment based on the unicast source Layer-2 ID of the selected 5G ProSe UE-to-Network relay (as specified in clause 5.8.3) during UE-to-Network Relay discovery as specified in clause 6.3.2.3.

In step 2, 5G ProSe Remote UE (UE-1) determines the Relay Service Code to be used. The Relay Service Code to be used is selected from the received Relay Service Code(s) during UE-to-Network Relay discovery as specified in clause 6.3.2.3.

In step 3, 5G ProSe Remote UE (UE-1) sends a unicast Direct Communication Request message to the selected 5G ProSe UE-to-Network Relay. The destination Layer-2 ID used to send the Direct Communication Request message shall be unicast Layer-2 ID as determined in step 1. The Direct Communication Request message includes:

Source User Info: the identity of the Remote UE requesting relay operation.

Target User Info: the identity of the UE-to-Network Relay provided to the 5G ProSe Remote UE during UE-to-Network Relay Discovery procedure.

Relay Service Code: indicates the connectivity service provided by the 5G ProSe UE-to-Network Relay as requested by the 5G ProSe Remote UE.

Security Information: the information for the establishment of security.

In step 4 and step 5, step 4a and step 5a are performed if the 5G ProSe UE-to-Network Relay's identity matches the identity provided in the Target User Info and the Relay Service Code is one of the Relay Service Codes included during UE-to-Network Relay discovery as specified in clause 6.3.2.3. The Source User Info in the Direct Communication Accept message is the identity of the UE-to-Network Relay. In case of 5G ProSe Layer-2 UE-to-Network Relay, the Remote UE does not send the IP Address Configuration, Link-Local IPv6 Address and QoS Info to the 5G ProSe Layer-2 UE-to-Network Relay, and the Direct Communication Accept message does not include IP Address Configuration, Link-Local IPv6 Address and QoS Info. In case of 5G ProSe Layer-3 UE-to-Network Relay, the Direct Communication Accept message does not include the IP Address Configuration indicating the value "address allocation not supported".

In case of 5G ProSe Layer-2 UE-to-Network Relay, step 6 is not performed.

For the Layer-2 link release as described in the clause 6.4.3.3,

In step1, if the Layer-2 link release procedure is initiated by the 5G ProSe UE-to-Network Relay, the Disconnect Request message may indicate the 5G ProSe UE-to-Network Relay is temporarily not available as described in clause 5.12.

NOTE: The form of the temporarily not available indication will be determined by stage 3.

If the service authorization for acting as a 5G ProSe Remote UE or as a 5G ProSe UE-to-Network Relay is revoked, the 5G ProSe UE-to-Network Relay should initiate the release of the layer-2 link that the revoked authorization affects.

For the Layer-2 link modification as described in the clause 6.4.3.4,

In step1, the Layer-2 link modification procedure may be initiated by the 5G ProSe Layer-3 Remote UE based on the application information received from its ProSe application layer. The Link Modification Request message may include the PC5 QoS Rule(s) for the PC5 QoS Flow(s) to be added or modified as described in clause 5.6.2.1. The Layer-2 link modification procedure may be initiated by the 5G ProSe Layer-3 UE-to-Network Relay based on the information received from the SMF via NAS signalling from SMF.

A 5G ProSe Remote UE and a 5G ProSe UE-to-Network Relay shall set up a separate PC5 unicast links if an existing unicast link(s) was established with a different Relay Service Code or without a Relay Service Code.

[ . . . ]

6.5.2 5G ProSe Communication Via 5G ProSe Layer-2 UE-to-Network Relay 6.5.2.1 Registration and Connection Management 6.5.2.1.1 Registration Management Registration Management for the 5G ProSe Layer-2 Remote UE and the 5G ProSe Layer-2 UE-to-Network Relay follows the principles and procedures defined in TS 23.501 [4] and TS 23.502 [5]. The 5G ProSe Layer-2

Remote UE and the 5G ProSe Layer-2 UE-to-Network Relay may be served by the same AMF or different AMFs.

6.5.2.1.2 Connection Management

Connection Management for the 5G ProSe Layer-2 Remote UE and the 5G ProSe Layer-2 UE-to-Network Relay follows the principles and procedures defined in TS 23.501 [4] and TS 23.502 [5] with the following modifications.

The 5G ProSe Layer-2 UE-to-Network Relay may only relay data/signalling for the 5G ProSe Layer-2 Remote UE(s) when the 5G ProSe Layer-2 UE-to-Network Relay is in CM-CONNECTED state. If the 5G ProSe Layer-2 UE-to-Network Relay is in CM_IDLE state and receives a connection request from the 5G ProSe Layer-2 Remote UE for relaying, the 5G ProSe Layer-2 UE-to-Network Relay shall trigger Service Request procedure to enter CM_CONNECTED state before relaying the 5G ProSe Layer-2 Remote UEs traffic.

The state of 5G ProSe UE-to-Network Relay is controlled by NG-RAN with the following:
- If any 5G ProSe Layer-2 Remote UE connected to the 5G ProSe Layer-2 UE-to-Network Relay is in CM-CONNECTED with RRC Connected state, the 5G ProSe Layer-2 UE-to-Network Relay should remain CM-CONNECTED state with RRC Connected state.
- If all 5G ProSe Layer-2 Remote UEs connected to the 5G ProSe Layer-2 UE-to-Network Relay enter CM-IDLE or CM-CONNECTED with RRC Inactive state, the 5G ProSe Layer-2 UE-to-Network Relay may enter CM-IDLE state or CM-CONNECTED with RRC Inactive state.

When 5G ProSe Layer-2 Remote UE is in CM-CONNECTED state, the 5G ProSe Layer-2 UE-to-Network Relay and 5G ProSe Layer-2 Remote UE keep the PC5 link. When the 5G ProSe Remote UE is in CM-IDLE state, it may either release the PC5 link for relaying or not.

For paging a 5G ProSe Layer-2 Remote UE, it follows the principles and procedures defined in TS 23.501 [4] and TS 23.502 [5], and the paging message delivery from NG-RAN to 5G ProSe Layer-2 Remote UE is specified in TS 38.351 [28].

6.5.2.2 Connection Establishment

Figure 11:
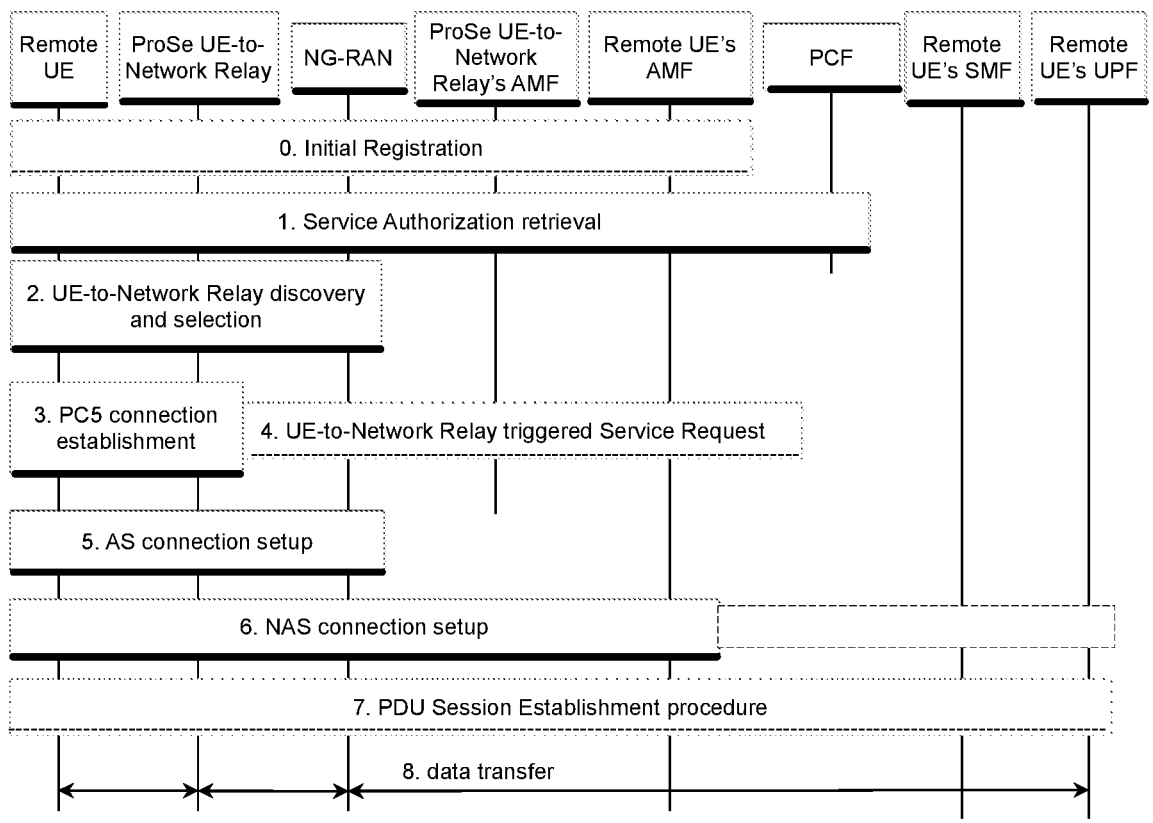
FIG. 11 is a reproduction of FIG. 6.5.2.1-1 of 3GPP TS 23.304 V17.0.0.

[FIG. 6.5.2.1-1 of 3GPP TS 23.304 V17.0.0, entitled "Connection Establishment for 5G ProSe Layer-2 UE-to-Network Relay", is reproduced as FIG. 11]

0. If in coverage, the 5G ProSe Layer-2 Remote UE and 5G ProSe Layer-2 UE-to-Network Relay may independently perform the initial registration to the network according to registration procedures in TS 23.502 [5].
1. If in coverage, the 5G ProSe Layer-2 Remote UE and 5G ProSe Layer-2 UE-to-Network Relay independently get the service authorization for 5G ProSe Layer-2 UE-to-Network Relay operation from the network. Service authorization and parameters provisioning for 5G ProSe Layer-2 UE-to-Network Relay operation are performed for the 5G ProSe Layer-2 UE-to-Network Relay and 5G ProSe Layer-2 Remote UE as specified in clause 5.1.4.
   - If the 5G ProSe Layer-2 Remote UE is not in coverage, the pre-configured parameters are used, and the service authorization and parameters may be updated after step 6.
   - If the 5G ProSe Layer-2 Remote UE has not performed Initial Registration, the 5G ProSe Layer-2 Remote UE may perform the Initial Registration in step 6.
2. The 5G ProSe Layer-2 Remote UE and 5G ProSe Layer-2 UE-to-Network Relay perform 5G ProSe UE-to-Network Relay Discovery and selection, as specified in clause 6.3.2.3.
3. The 5G ProSe Layer-2 Remote UE initiates a one-to-one communication connection with the selected 5G ProSe Layer-2 UE-to-Network Relay over PC5 using the procedure as described in clause 6.4.3.
4. If the 5G ProSe Layer-2 UE-to-Network Relay is in CM_IDLE state, triggered by the request received from the 5G ProSe Layer-2 Remote UE, the 5G ProSe Layer-2 UE-to-Network Relay performs Service Request procedure in the clause 4.2.3.2 of TS 23.502 [5].

Editor's note: How the ProSe UE-to-Network Relay is triggered to perform Service Request procedure requires cooperation with RAN2 and SA3 progress on mutual authentication during PC5 connection establishment.

5. The 5G ProSe Layer-2 Remote UE establishes an RRC Connection with the same NG-RAN serving the selected 5G ProSe Layer-2 UE-to-Network Relay, specified in TS 38.351 [28].
6. The 5G ProSe Layer-2 Remote UE sends a NAS message to the serving AMF. The NAS message is encapsulated in an Uu RRC message that is sent over PC5 to the 5G ProSe Layer-2 UE-to-Network Relay, and the 5G ProSe Layer-2 UE-to-Network Relay forwards the Uu RRC message to the NG-RAN specified in TS 38.351 [28]. NG-RAN selects the 5G ProSe Layer-2 Remote UE's serving AMF and forwards the NAS message to this AMF.
   - If 5G ProSe Layer-2 Remote UE has not performed the initial registration, the NAS message is an initial Registration message. Otherwise, the NAS message is either a service request message, or a mobility or periodic Registration message.
7. The 5G ProSe Layer-2 Remote UE may trigger the PDU Session Establishment procedure as defined in clause 4.3.2.2 of TS 23.502 [5].
8. The data is transferred between the 5G ProSe Layer-2 Remote UE and UPF via the 5G ProSe Layer-2 UE-to-Network Relay and NG-RAN. The 5G ProSe Layer-2 UE-to-Network Relay forwards all the data messages between the 5G ProSe Layer-2 Remote UE and NG-RAN, as specified in TS 38.351 [28].

3GPP R2-2111437 introduces Sidelink Relay to NR Rel-17 in 3GPP TS 38.300. The remote UE paging reception via UE-to-Network (U2N) Relay is specified in 3GPP R2-2111437 as follows:

16.x.5.4 Paging

When both U2N Relay UE and U2N Remote UE are in RRC IDLE/RRC INACTIVE, the U2N Relay UE monitors paging occasions of its PC5-RRC connected U2N Remote UE(s). When a U2N Relay UE needs to monitor paging for a U2N Remote UE, the U2N Relay UE should monitor all POs for the U2N Remote UE.

When U2N Relay UE is in RRC CONNECTED and U2N Remote UE(s) is in RRC_IDLE or RRC_INACTIVE, there are two options for paging delivery:
- The U2N Relay UE monitors POs of its connected U2N Remote UE(s) if the active DL BWP of U2N Relay UE is configured with CORESET and common search space.
- The delivery of the U2N Remote UE's paging can be performed through dedicated RRC message from the gNB to the U2N Relay UE. The dedicated RRC message for delivering Remote UE paging to the RRC_CONNECTED Relay UE may contain one or more Remote UE IDs (5G-S-TMSI or I-RNTI).

It is up to network implementation to decide which one to use. The U2N Relay UE in RRC CONNECTED, if configured with paging common search space, can determine whether to monitor POs for a U2N Remote UE based on PC5-RRC signalling received from the U2N Remote UE.

Editor's Note: FFS whether the U2N Relay UE in RRC_IDLE/INACTIVE can also determine to monitor POs for a U2N Remote UE based on PC5-RRC signalling received from the U2N Remote UE.

The U2N Remote UE in RRC_IDLE/RRC_INACTIVE provides 5G-S-TMSI/I-RNTI and its Uu DRX cycle information to the U2N Relay UE for PO monitoring. The L2 U2N Relay UE can notify Remote UE ID (i.e. 5G-S-TMSI/I-RNTI) information to the gNB via dedicated RRC message for paging delivery purpose. The U2N Relay UE decodes received paging message to derive the 5G-S-TSMI/I-RNTI and send paging to the Remote UE accordingly.

Editor's Note: FFS what is the Uu DRX cycle information as described at above paragraph The U2N Relay UE uses unicast signalling to send paging to the U2N Remote UE via PC5.

Figure 12:
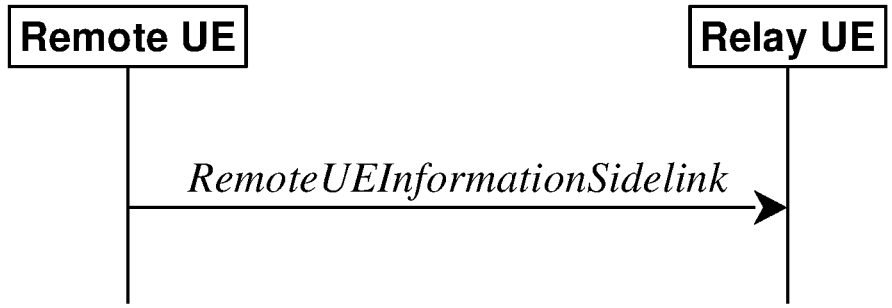
FIG. 12 is a reproduction of FIG. 5.8.9.x2.1-1 of 3GPP R2-2111490.

3GPP R2-2111490 introduces Sidelink Relay to NR Rel-17 in 3GPP TS 38.331. The remote UE paging reception via UE-to-Network (U2N) Relay is specified in 3GPP R2-2111490 as follows:

5.8.9.x2 Remote UE information
5.8.9.x2.1 General
[FIG. 5.8.9.x2.1-1 of 3GPP R2-2111490, entitled "Remote UE information", is reproduced as FIG. 12]

This procedure is used by the L2 U2N Remote UE in RRC_IDLE/RRC_INACTIVE to inform the required SIB(s) and provide Paging related information to the connected L2 U2N Relay UE.

Editor's note: Updates would be needed if it is conclude two separate messages for paging information and SIB request at later meetings.

5.8.9.x2.2 Actions Related to Transmission of RemoteInformationSidelink Message

Figure 13:
FIG. 13 is a reproduction of FIG. 5.8.9.x3.1-1 of 3GPP R2-2111490.

The L2 U2N Remote UE in RRC_IDLE or RRC_INACTIVE shall:
1> if the UE has not stored a valid version of a SIB, in accordance with clause 5.2.2.2.1, of one or several required SIB(s) in accordance with clause 5.2.2.1:
  2> include sl-Requested-SI-List in the RemoteUEInformationSidelink to indicate the requested SIB(s);
Editor's note: FFS how to capture the handling of MIB and SIB1.
1> set sl-RemotePagingIdentity as follows:
  2> if the L2 U2N Remote UE is in RRC_IDLE:
    3> include ng-5G-S-TMSI in the sl-RemotePagingIdentity;
    3> include UE specific DRX cycle in the sl-PagingCycle;
  2> else if the L2 U2N Remote UE is in RRC_INACTIVE:
    3> include ng-5G-S-TMSI and full-RNTI in the sl-RemotePagingIdentity;
    3> include UE specific DRX cycle in the sl-PagingCycle;
1> submit the RemoteUEInformationSidelink message to lower layers for transmission;

5.8.9.x3 Uu Message Transfer in Sidelink
5.8.9.x3.1 General
[FIG. 5.8.9.x3.1-1 of 3GPP R2-2111490, entitled "Uu message transfer in sidelink", is reproduced as FIG. 13]

The purpose of this procedure is to transfer Paging message and System Information from the L2 U2N Relay UE to the L2 U2N Remote UE in RRC_IDLE/RRC_INACTIVE.

Editor's note: Updates would be needed if it is conclude two separate messages for paging and SIB forwarding at later meetings.

5.8.9.x3.2 Actions Related to Transmission of UuMessageTransferSidelink Message

The L2 U2N Relay UE initiates the Uu message transfer upon receiving Paging message and System Information related to the connected L2 U2N Remote UE from network. The UE shall set the contents of UuMessageTransferSidelink message as follows:
1> include sl-PagingDelivery if the Paging message received from network containing the associated ue-Identity of the L2 U2N Remote UE;
1> include sl-SystemInformationDelivery if the System Information message received from network is requested by the L2 U2N Remote UE;
1> submit the UuMessageTransferSidelink message to lower layers for transmission.

5.8.9.x3.3 Reception of the UuMessogeTransferSideink

Upon receiving the UuMessageTransferSidelink message, the L2 U2N Remote UE shall:
1> if sl-PagingDelivery is included:
  2> perform the procedure as defined in clause 5.3.2.3;
1> if sl-SystemInformationDeliverySidelink is included:
  2> perform the actions specified in clause 5.2.2.4;

3GPP TS 23.304 describes support of UE-to-Network Relay in the following release (i.e. Release 17), which means a relay UE will be used to support communication between a remote UE and the network in case the remote UE cannot access the network directly. There are two different types of solutions for UE-to-Network (U2N) Relay, i.e. a Layer-2 (based) U2N Relay and a Layer-3 (based) U2N Relay.

FIG. 6.5.2.1-1 of 3GPP TS 23.304 V17.0.0 describes connection establishment for 5G ProSe Layer-2 UE-to-Network Relay. After the initial registration and service authorization retrieval are performed by the remote UE when it is in coverage, the remote UE may perform UE-to-Network Relay discovery and selection if there is a request for a connectivity service from the upper layers or an upper layer application. Both Model A discovery and Model B discovery are supported for the remote UE to discover a U2N Relay. Model A uses a single discovery protocol message (i.e. Discovery Announcement) and Model B uses two discovery protocol messages (i.e. Discovery Solicitation and Discovery Response). A Relay Service Code (RSC) is included in the 5G ProSe UE-to-Network Relay discovery to indicate the connectivity service which a relay UE provides to the remote UE or the remote UE requests from the relay UE. The RSCs are configured to the relay UE and the remote UE as according to Section 5.1.4 of 3GPP TS 23.304. A relay UE supporting multiple RSCs can advertise the RSCs using multiple discovery messages, with one RSC per discovery message. A remote UE may monitor announcement messages with a RSC corresponding to a desired connectivity service. In case there are multiple relay UEs in proximity of the remote UE, one of the relay UEs may be selected based on e.g. the RSCs included in the discovery messages and measurement results on the discovery messages transmitted by relay UEs.

After selecting a suitable relay UE, the remote UE may then establish a PC5 unicast link with the relay UE to support U2N Relay operation. The remote UE may include the RSC in a Direct Communication Request message transmitted to the relay UE for establishing the PC5 unicast link. After the PC5 unicast link has been established, the remote UE may then establish a Radio Resource Control (RRC) Connection with the same NG-RAN (i.e. gNB) serving the selected relay UE and set up a NAS connection with the serving AMF. Finally, the remote UE may establish a Protocol Data Unit (PDU) session with the network (i.e. UPF) to get the desired connectivity service provided by a data network. The relay UE may forwards all the service data between the remote UE and the NG-RAN. If the remote UE wants to access another connectivity service via the relay UE, another separate PC5 unicast link shall be established with the relay UE.

Given a PC5 unicast link established between the remote UE and the relay UE for accessing a connectivity service via the relay UE, the remote UE may also receive the paging message from the relay UE according to 3GPP R2-2111437. The remote UE may transmit an identity of the remote UE and a UE specific DRX cycle to the relay UE so that the relay UE can monitor all paging occasions (POs) for the remote UE or receive the paging message via dedicated RRC signalling from the NG-RAN and then forward the paging message to the remote UE, as discussed in 3GPP R2-2111437 and R2-2111490. Paging allows the network to reach remote UEs in RRC_IDLE and in RRC_INACTIVE through paging messages. In other words, the paging message is used to inform the remote UE of a mobile-terminating service (e.g. a terminating call). When receiving the paging message, the remote UE in RRC_IDLE or RRC_INACTIVE may then initiate a RRC procedure to establish or resume a RRC connection so as to access the mobile-terminating service from the network.

Since a remote UE needs to discover a relay UE and establish a PC5 unicast link with the relay UE according to a RSC corresponding to a desired connectivity service, it implies the remote UE shall start relay discovery when the upper layers (or an upper layer application) request the desired connectivity service. In other words, the current U2N Relay operation is triggered only when there is a mobile-originating service request from the upper layers. And, a mobile-terminating service can be available only when there is an active mobile-originating service in the remote UE. However, it would be beneficial for a remote UE to connect with a relay UE just for receiving paging messages via the relay UE so that it could access a mobile-terminating service (e.g. a terminating call) from the network when there is no active mobile-originating service in the remote UE.

One potential solution, in general, could be to define a specific RSC used to support remote UE paging reception via U2N relay. Upon a request for paging reception from the upper layers or an upper layer application, the remote UE may discover a relay UE and establish a PC5 unicast link with the relay UE using the specific RSC. The specific RSC may be included in a relay discovery message transmitted by the remote UE or the relay UE. The remote UE may also include the specific RSC in a Direct Communication Request message transmitted to the relay UE for establishing the PC5 unicast link. After the PC5 unicast link has been established, the remote UE may transmit an identity of the remote UE and a UE specific DRX cycle configured for the remote UE to the relay UE so that the relay UE can monitor/receive paging messages for the remote UE. The relay UE may then forward paging information or message to the remote UE if there is any paging message for the remote UE received from the network. The remote UE does not initiate any PDU session establishment toward the network (e.g. UPF) in response to the request for paging reception from the upper layers or an upper layer application. If a separate PC5 unicast link with the relay UE is established using other RSC, the remote UE may release the PC5 unicast link used to support remote UE paging reception via U2N relay because this PC5 unicast link is no more needed. In one embodiment, the specific RSC may be a default value, a predefined value, or configured to the remote UE by the network.

Alternatively, any RSC configured to the remote UE may be used to support remote UE paging reception via U2N relay. In other words, the remote UE may use any RSC to discover a relay UE and establish a PC5 unicast link with the relay UE, while the remote UE does not establish a PDU session corresponding to the RSC toward the network after the PC5 unicast link is established. After the PC5 unicast link has been established, the remote UE may transmit an identity of the remote UE and a UE specific Discontinuous Reception (DRX) cycle configured for the remote UE to the relay UE so that the relay UE can monitor/receive paging messages for the remote UE. The relay UE may then forward paging information or message to the remote UE if there is any paging message for the remote UE received from the network. If a separate PC5 unicast link with the relay UE is established using other RSC, the remote UE may release the PC5 unicast link used to support remote UE paging reception via U2N relay because this PC5 unicast link is no more needed. In one embodiment, the RSC may be configured to the remote UE by the network.

Figure 14:
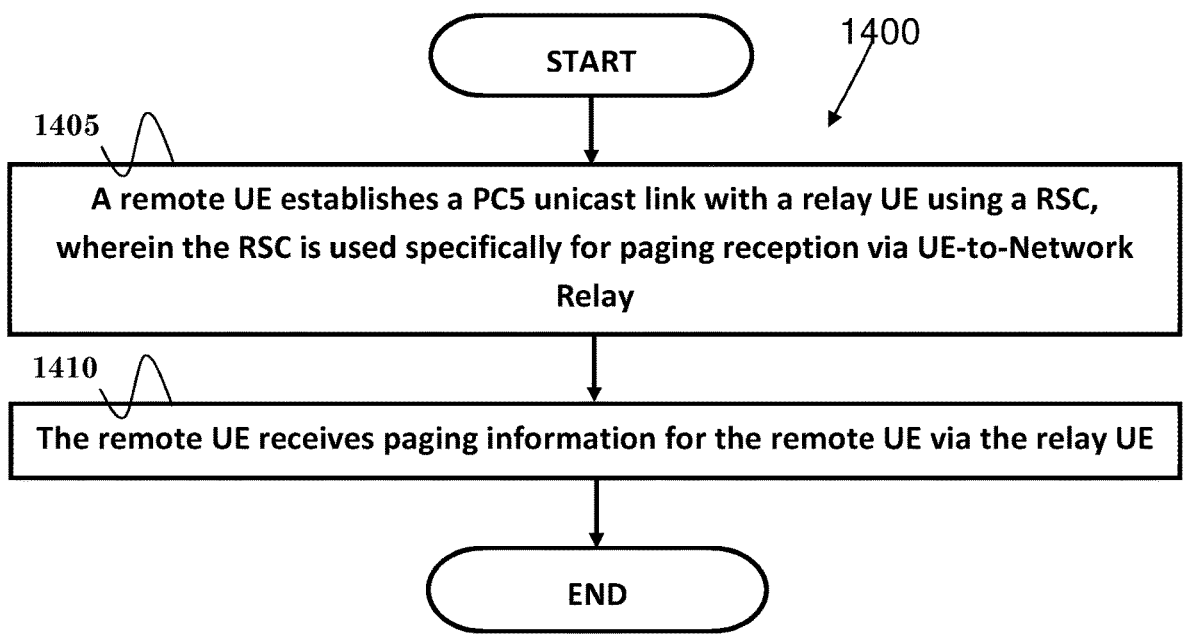
FIG. 14 is a flow chart according to one exemplary embodiment.

FIG. 14 is a flow chart 1400 for a method for paging reception via UE-to-Network Relay. In step 1405, a remote UE establishes a PC5 unicast link with a relay UE using a RSC, wherein the RSC is used specifically for paging reception via UE-to-Network Relay. In step 1410, the remote UE receives paging information for the remote UE via the relay UE. In one embodiment, the remote UE may discover the relay UE with the RSC.

In one embodiment, the RSC could be included in a Direct Communication Request message transmitted to the relay UE for establishing the PC5 unicast link. The RSC could also be included in a UE-to-Network Relay Discovery Announcement message transmitted by the relay UE or a UE-to-Network Relay Discovery Solicitation message transmitted by the remote UE. The RSC could be a default value, a predefined value, or configured by a network.

In one embodiment, the remote UE could transmit an identity of the remote UE and a UE specific DRX cycle to the relay UE. The remote UE may not initiate any PDU session establishment toward the network due to the request for paging reception from the upper layers or the upper layer application. The remote UE could initiate a procedure to release the PC5 unicast link if the other PC5 unicast link is established between the remote UE and the relay UE using a different RSC. In one embodiment, the relay UE may be a Layer-2 UE-to-Network Relay. The PC5 unicast link may be a Layer-2 link. In one embodiment, establishment of the PC5 unicast link could be initiated due to a request for paging reception from upper layers or an upper layer application.

Referring back to FIGS. 3 and 4, in one exemplary embodiment of a method for a remote UE, the remote UE 300 includes a program code 312 stored in the memory 310. The CPU 308 could execute program code 312 to enable the remote UE (i) to establish a PC5 unicast link with a relay UE using a RSC, wherein the RSC is used specifically for paging reception via UE-to-Network Relay, and (ii) to receive paging information for the remote UE via the relay UE. Furthermore, the CPU 308 can execute the program code 312 to perform all of the above-described actions and steps or others described herein.

Figure 15:
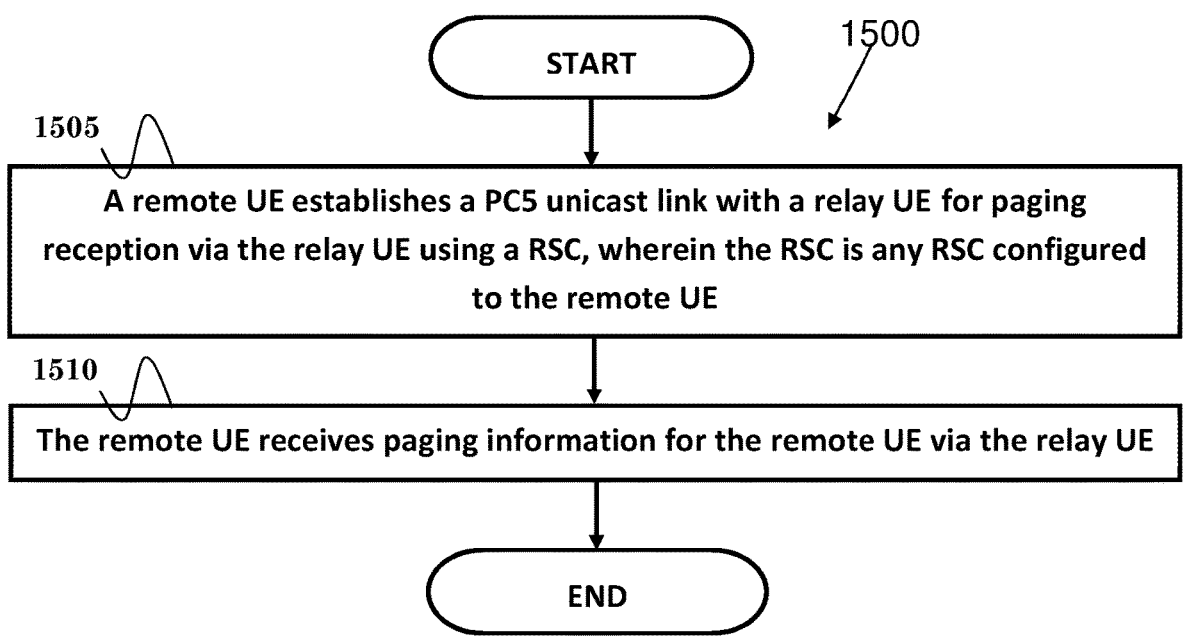
FIG. 15 is a flow chart according to one exemplary embodiment.

FIG. 15 is a flow chart 1500 for a method for paging reception via UE-to-Network Relay. In step 1505, a remote UE establishes a PC5 unicast link with a relay UE for paging reception via the relay UE using a RSC, wherein the RSC is any RSC configured to the remote UE. In step 1510, the remote UE receives paging information for the remote UE via the relay UE. In one embodiment, establishment of the PC5 unicast link could be initiated due to a request for paging reception from upper layers or an upper layer application.

In one embodiment, the remote UE could discover the relay UE with the RSC. The RSC may be included in a Direct Communication Request message transmitted to the relay UE for establishing the PC5 unicast link. The RSC may also be included in a UE-to-Network Relay Discovery Announcement message transmitted by the relay UE or a UE-to-Network Relay Discovery Solicitation message transmitted by the remote UE.

In one embodiment, the RSC could indicate a connectivity service which the relay UE provides to the remote UE. The remote UE could transmit an identity of the remote UE and a UE specific DRX cycle to the relay UE.

In one embodiment, the remote UE may not initiate any PDU session establishment toward a network due to the request for paging reception from the upper layers or the upper layer application. The remote UE may initiate a procedure to release the PC5 unicast link if the other PC5 unicast link is established between the remote UE and the relay UE using a different RSC.

In one embodiment, the relay UE may be a Layer-2 UE-to-Network Relay. The PC5 unicast link may be a Layer-2 link.

Referring back to FIGS. 3 and 4, in one exemplary embodiment of a method for a remote UE, the remote UE 300 includes a program code 312 stored in the memory 310. The CPU 308 could execute program code 312 to enable the remote UE (i) to establish a PC5 unicast link with a relay UE for paging reception via the relay UE using a RSC, wherein the RSC is any RSC configured to the remote UE, and (ii) to receive paging information for the remote UE via the relay UE. Furthermore, the CPU 308 can execute the program code 312 to perform all of the above-described actions and steps or others described herein.

In general, a (remote) UE would first perform cell selection to select a suitable cell for camping after power on. If no suitable cell is found or the reception quality of the cell is low, the UE may then determine to find a relay UE so that the (remote) UE can camp on the serving cell of the relay UE via the relay UE at least for receiving paging information of the remote UE via the relay UE. Thus, alternatively the remote UE supporting the use of layer-2 U2N Relay could firstly discover at least a layer-2 relay UE(s) when/if/after the remote UE is enabled (and/or authorised) to use layer-2 U2N Relay. The remote UE could then select a layer-2 relay UE and connect to the selected layer-2 relay UE. The remote UE could establish a first layer-2 link (or called PC5 unicast link or PC5-S connection) with the selected layer-2 relay UE. The remote UE could send a PC5-S message used for request of establishing the first layer-2 link (e.g. Direct Communication Request message) to the layer-2 relay UE. The PC5-S message or the Direct Communication Request message could include a first RSC found in a discovery message received from the layer-2 relay UE.

The remote UE supporting the use of layer-2 U2N Relay could start to discover at least the layer-2 relay UE(s) and/or connect with the selected layer-2 relay UE before initiation of a very first connectivity service (for forwarding traffic between the remote UE and network via any (layer-2) relay UE). By this way, it is possible to realize that the remote UE can receive paging information for the remote UE from the layer-2 relay UE before initiation of the very first connectivity service. The remote UE could send a first PC5 RRC message (e.g. RemoteInformationSidelink message) for need of receiving paging information for the remote UE to the relay UE over the first layer-2 link. The first PC5 RRC message could include an identity of the remote UE (e.g. S-TMSI and/or I-RNTI) and a UE specific DRX cycle. The relay UE could then send a second PC5 RRC message (e.g. UuMessageTransferSidelink message) including paging information for the remote UE to the remote UE over the first layer-2 link.

Possibly, the remote UE could also support the use of layer-3 U2N Relay. Once the very first connectivity service is initiated, the remote UE could perform relay reselection for reselecting a new relay UE. For example, the very first connectivity service could be associated with a second RSC being offering layer-3 U2N Relay service. In this situation, the remote UE could perform relay discovery to discover at least a layer-3 relay UE(s). The remote UE could reselect a layer-3 relay UE from the discovered layer-3 relay UE(s) and connects to the layer-3 relay UE by establishing a second layer-2 link with the layer-3 relay UE. In this case, the remote UE could release the first layer-2 link. Another possibility is that the remote UE could establish the second layer-2 link with the layer-3 relay UE while still keep the first layer-2 link established with the layer-2 relay UE. In this case, the remote UE could receive the paging information for the remote UE from the layer-2 relay UE over the first layer-2 link and transfer traffic of the very first connectivity service between the remote UE and the network via the layer-3 relay UE over the second layer-2 link.

As another example, if the very first connectivity service is also associated with the first RSC, the remote UE would still keep the first layer-2 link established with the layer-2 relay UE. The remote UE could initiate a PDU session establishment procedure for the very first connectivity service with the network via the layer-2 relay UE (over the first layer-2 link).

It is also possible that the very first connectivity service is associated with a third RSC being offering layer-2 U2N Relay service and the layer-2 relay UE could also send another discovery message including the third RSC. In this situation, the remote UE could establish a third layer-2 link with the layer-2 relay UE. The establishment of the third layer-2 link may be because the first RSC associated with the first layer-2 link is different from the third RSC associated with the third layer-2 link. In this case, the remote UE could initiate the PDU session establishment procedure for the very first connectivity service with the network via the layer-2 relay UE (over the third layer-2 link). In this case, the remote UE could release the first layer-2 link. Alternatively, instead of establishing the third layer-2 link and releasing the first layer-2 link, it is also possible that the remote UE could initiate the PDU session establishment procedure for the very first connectivity service with the network via the layer-2 relay UE over the first layer-2 link, since both the first RSC and the third RSC are associated with layer-2 U2N Relay service.

Figure 16:
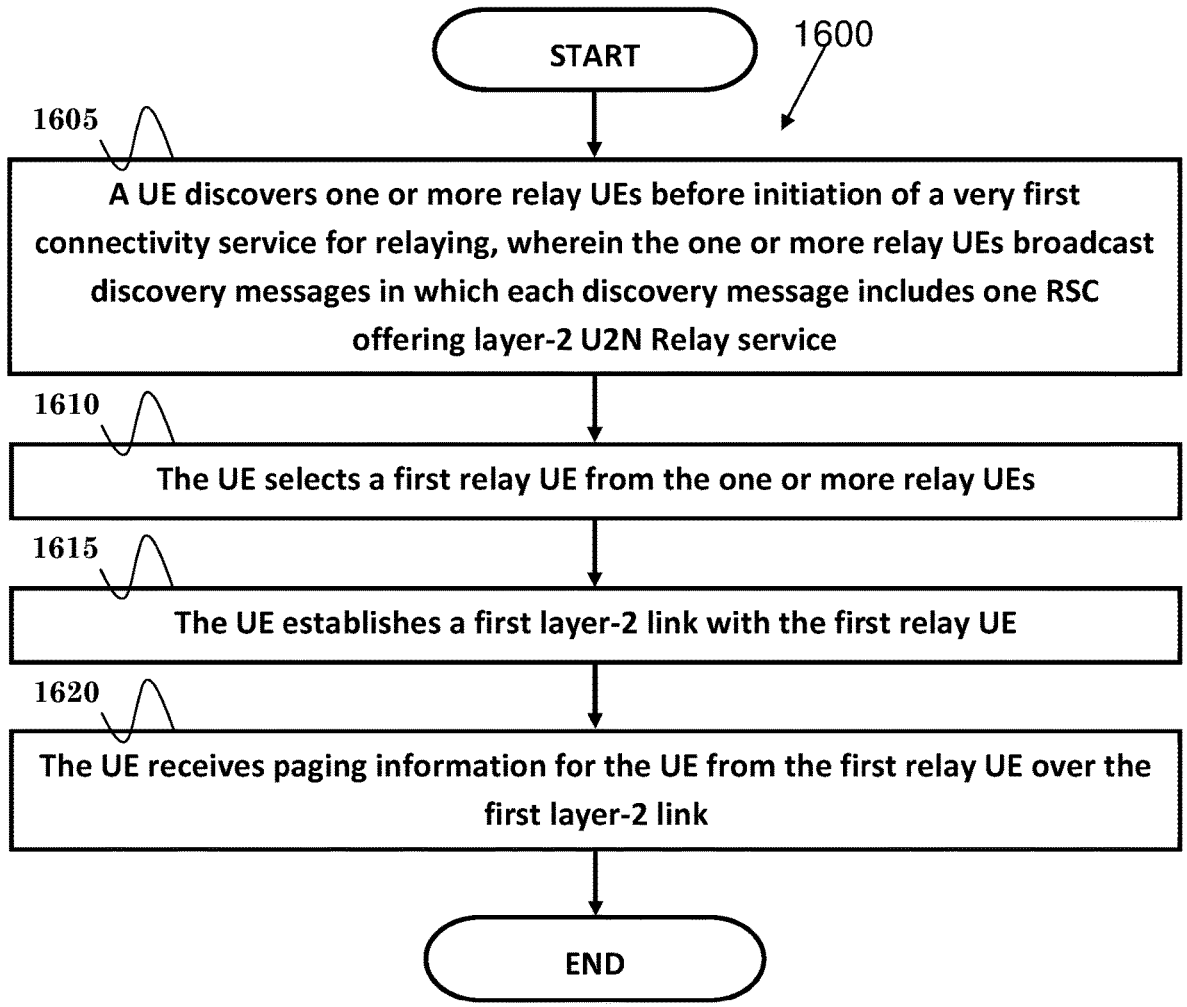
FIG. 16 is a flow chart according to one exemplary embodiment.

FIG. 16 is a flow chart 1600 for a method for paging reception via UE-to-Network Relay. In step 1605, a UE discovers one or more relay UEs before initiation of a very first connectivity service for relaying, wherein the one or more relay UEs broadcast discovery messages in which each discovery message includes one RSC offering layer-2 U2N Relay service. In step 1610, the UE selects a first relay UE from the one or more relay UEs. In step 1615, the UE establishes a first layer-2 link with the first relay UE. In step 1620, the UE receives paging information for the UE from the first relay UE over the first layer-2 link.

Referring back to FIGS. 3 and 4, in one exemplary embodiment of a method for a UE, the UE 300 includes a program code 312 stored in the memory 310. The CPU 308 could execute program code 312 to enable the UE (i) to discover one or more relay UEs before initiation of a very first connectivity service for relaying, wherein the one or more relay UEs broadcast discovery messages in which each discovery message includes one RSC offering layer-2 U2N Relay service, (ii) to select a first relay UE from the one or more relay UEs, (iii) to establish a first layer-2 link with the first relay UE, and (iv) to receive paging information for the UE from the first relay UE over the first layer-2 link. Furthermore, the CPU 308 can execute the program code 312 to perform all of the above-described actions and steps or others described herein.

Figure 17:
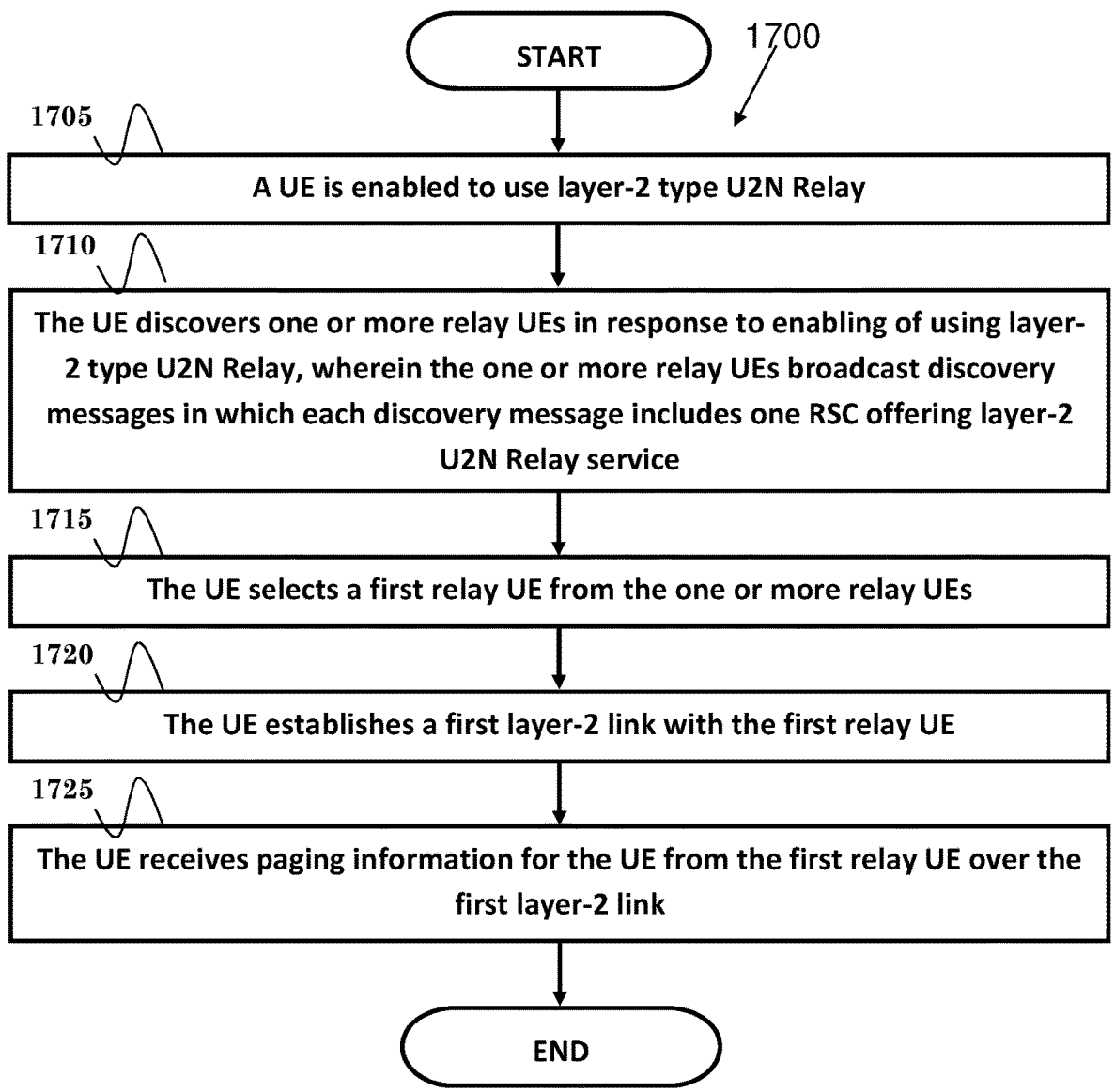
FIG. 17 is a flow chart according to one exemplary embodiment.

FIG. 17 is a flow chart 1700 for a method for paging reception via UE-to-Network Relay. In step 1705, a UE is enabled to use layer-2 type U2N Relay. In step 1710, the UE discovers one or more relay UEs in response to enabling of using layer-2 type U2N Relay, wherein the one or more relay UEs broadcast discovery messages in which each discovery message includes one RSC offering layer-2 U2N Relay service. In step 1715, the UE selects a first relay UE from the one or more relay UEs. In step 1720, the UE establishes a first layer-2 link with the first relay UE. In step 1725, the UE receives paging information for the UE from the first relay UE over the first layer-2 link.

Referring back to FIGS. 3 and 4, in one exemplary embodiment of a method for a UE, the UE 300 includes a program code 312 stored in the memory 310. The CPU 308 could execute program code 312 to enable the UE (i) to be enabled to use layer-2 type U2N Relay, (ii) to discover one or more relay UEs in response to enabling of using layer-2 type U2N Relay, wherein the one or more relay UEs broadcast discovery messages in which each discovery message includes one RSC offering layer-2 U2N Relay service, (iii) to select a first relay UE from the one or more relay UEs, (iv) to establish a first layer-2 link with the first relay UE, and (v) to receive paging information for the UE from the first relay UE over the first layer-2 link. Furthermore, the CPU 308 can execute the program code 312 to perform all of the above-described actions and steps or others described herein.

In the context of the embodiments illustrated in FIGS. 16 and 17 and discussed above, in one embodiment, the UE may not be initiated any connectivity service for relaying yet before the UE starts to discover the one or more relay UEs. The first layer-2 link may be associated with a first RSC, and the first RSC could indicate the first relay UE offering layer-2 U2N Relay service.

In one embodiment, the UE could initiate a connectivity service for relaying after establishing the layer-2 link with the relay UE. The connectivity service may be associated with a second RSC, and the second RSC is associated with layer-3 U2N Relay service.

In one embodiment, the UE could reselect a second relay UE, wherein the second relay UE sends a discovery message including the second RSC. The UE could establish a second PC5 unicast link with the second relay UE. The UE could release the first PC5 unicast link with the first relay UE. The connectivity service may be associated with the first RSC.

In one embodiment, the UE could initiate a PDU session establishment procedure or establishes a PDU session for the connectivity service with a network node via the first relay UE. The UE could transfer traffic of the connectivity service between the UE and the network node via the first relay UE over the first layer-2 link.

In one embodiment, the first relay UE may be a layer-2 relay UE. The second relay UE may be a layer-3 relay UE. The UE may be a remote UE. The network node may be a base station, Access and Mobility Management Function (AMF), Session Management Function (SMF), or User Plane Function (UPF).

Figure 18:
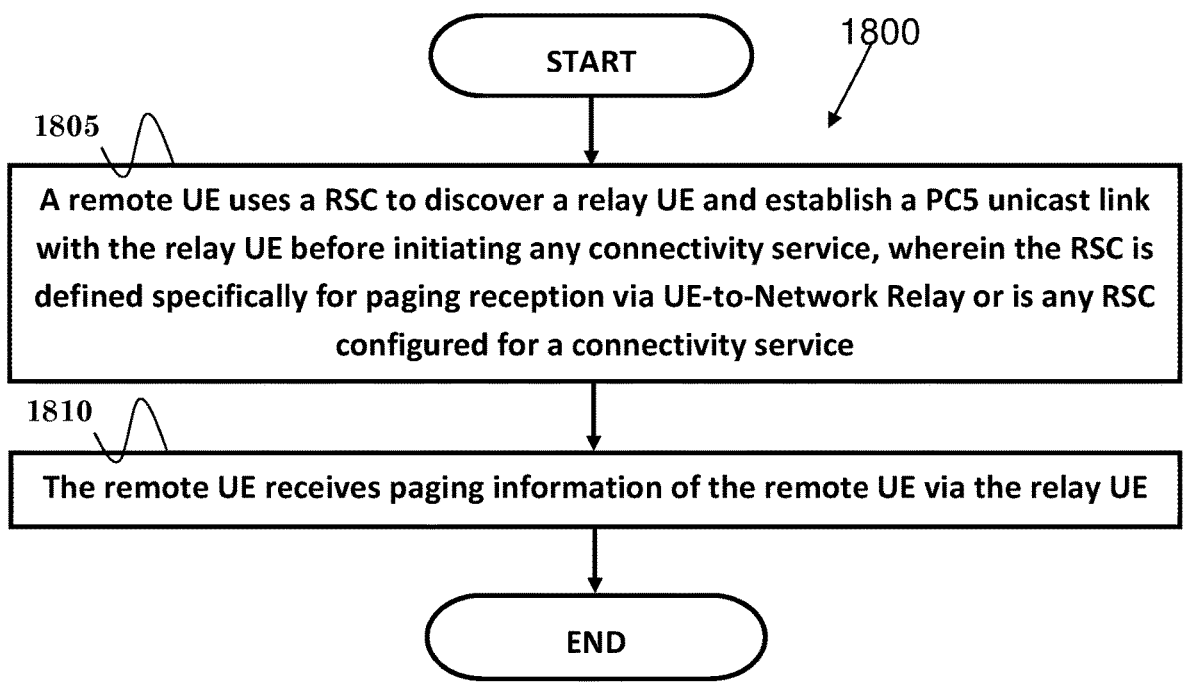
FIG. 18 is a flow chart according to one exemplary embodiment.

FIG. 18 is a flow chart 1800 for a method for paging reception via UE-to-Network Relay. In step 1805, a remote UE uses a RSC to discover a relay UE and establish a PC5 unicast link with the relay UE before initiating any connectivity service, wherein the RSC is defined specifically for paging reception via UE-to-Network Relay or is any RSC configured for a connectivity service. In step 1810, the remote UE receives paging information of the remote UE via the relay UE.

In one embodiment, the RSC may be included in a UE-to-Network Relay Discovery Announcement message transmitted by the relay UE or a UE-to-Network Relay Discovery Solicitation message transmitted by the remote UE. The RSC may also be included in a Direct Communication Request message transmitted to the relay UE for establishing the PC5 unicast link. The RSC defined specifically for paging reception via UE-to-Network Relay may be a default value, a predefined value, or configured by a network. Any RSC configured for a connectivity service could indicate the connectivity service which the relay UE provides to the remote UE.

In one embodiment, the remote UE could transmit an identity of the remote UE and a UE specific DRX cycle to the relay UE. The remote UE could initiate a procedure to release the PC5 unicast link if the other PC5 unicast link is established between the remote UE and the relay UE using a different RSC.

In one embodiment, the relay UE may be a Layer-2 UE-to-Network Relay. The PC5 unicast link may be a Layer-2 link.

Referring back to FIGS. 3 and 4, in one exemplary embodiment of a method for a remote UE, the remote UE 300 includes a program code 312 stored in the memory 310. The CPU 308 could execute program code 312 to enable the remote UE (i) to use a RSC to discover a relay UE and establish a PC5 unicast link with the relay UE before initiating any connectivity service, wherein the RSC is defined specifically for paging reception via UE-to-Network Relay or is any RSC configured for a connectivity service, and (ii) to receive paging information of the remote UE via the relay UE. Furthermore, the CPU 308 can execute the program code 312 to perform all of the above-described actions and steps or others described herein.

According to 3GPP TS 38.304, when a UE is switched on, a public land mobile network (PLMN) should be selected by NAS layer. And then, the UE may initiate a registration procedure with the network if needed. After the registration procedure is done, the network is able to reach the UE via paging if a mobile-terminating service toward the UE is initiated. According to 3GPP TS 23.304, a L2 remote UE needs to discover one or more L2 relay UEs in order to find authorized/available PLMNs and then selects one of the authorized/available PLMNs in NAS PLMN selection. Therefore, the L2 remote UE could initiate relay discovery for PLMN selection after it is switched on.

According to 3GPP TS 23.304, a remote UE needs to discover a relay UE and establish a PC5 unicast link with the relay UE according to a RSC corresponding to a desired connectivity service, it implies the remote UE shall start relay discovery when the upper layers (or an upper layer application) request the desired connectivity service. In other words, the current U2N Relay operation is triggered only when there is a mobile-originating service request from the upper layers. However, an out-of-coverage (OOC) L2 remote UE may need to perform a registration procedure with the network so as to receive paging from the network after it is switched on. In this situation, the L2 remote UE needs to discover and connects with a suitable relay UE for registration with the network via this relay UE. In other words, a L2 remote UE may need to connect with a suitable relay UE before the upper layers (or an upper layer application) request a desired connectivity service.

One potential solution, in general, could be to define a specific RSC used for relay UE discovery due to remote UE switch on (or power on) or a need for registration. The remote UE may discover a relay UE (and establish a PC5 unicast link with the relay UE) using the specific RSC. The specific RSC may be included in a relay discovery message transmitted by the remote UE or the relay UE. The remote UE may also include the specific RSC in a Direct Communication Request message transmitted to the relay UE for establishing the PC5 unicast link. After the PC5 unicast link has been established, the remote UE may initiate a registration procedure with the network via the relay UE over the PC5 unicast link. After the PC5 unicast link has been established, the remote UE may transmit an identity of the remote UE and a UE specific DRX cycle configured for the remote UE to the relay UE so that the relay UE can monitor/receive paging messages for the remote UE. The relay UE may then forward paging information or message to the remote UE if there is any paging message for the remote UE received from the network. Preferably, the specific RSC may be a default value, a predefined value, or configured to the remote UE by the network.

Alternatively, the remote UE could use any RSC offering layer-2 U2N Relay service for discovering one or more L2 U2N relay UEs when the remote UE is switched on. The RSC may be provisioned or (pre)configured to the UE. The remote UE could then select a layer-2 relay UE and connect to the selected layer-2 relay UE. The remote UE could establish a first layer-2 link (or called PC5 unicast link or PC5-S connection) with the selected layer-2 relay UE. The remote UE could send a PC5-S message used for request of establishing the first layer-2 link (e.g. Direct Communication Request message) to the layer-2 relay UE. The PC5-S message or the Direct Communication Request message could include a first RSC found in a discovery message received from the selected layer-2 relay UE.

The remote UE supporting the use of layer-2 U2N Relay could start to discover at least the layer-2 relay UE(s) and/or connect with the selected layer-2 relay UE before initiation of a very first connectivity service (for forwarding traffic between the remote UE and network via any (layer-2) relay UE). By this way, it may be possible to realize that the remote UE can receive paging information for the remote UE from the layer-2 relay UE before initiation of the very first connectivity service. The remote UE could send a first PC5 RRC message (e.g. RemoteInformationSidelink message) for need of receiving paging information for the remote UE to the relay UE over the first layer-2 link. The first PC5 RRC message could include an identity of the remote UE (e.g. S-TMSI and/or I-RNTI) and a UE specific DRX cycle. The relay UE could then send a second PC5 RRC message (e.g. UuMessageTransferSidelink message) including paging information for the remote UE to the remote UE over the first layer-2 link.

If the very first connectivity service is initiated (and is associated with the first RSC or another RSC also offering L2 U2N Relay service), the remote UE could initiate a PDU session establishment procedure for the very first connectivity service with the network via the layer-2 relay UE (over the first layer-2 link).

Figure 19:
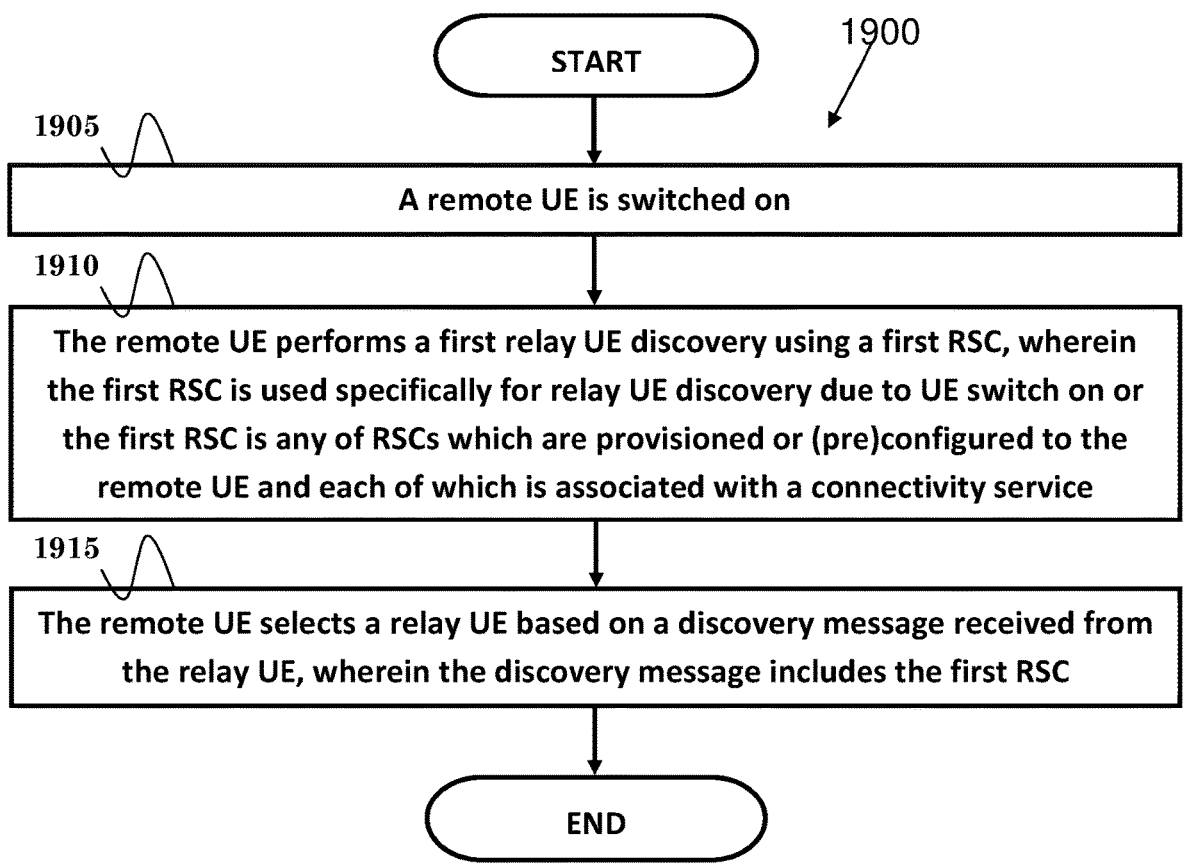
FIG. 19 is a flow chart according to one exemplary embodiment.

FIG. 19 is a flow chart 1900 for a method for paging reception via UE-to-Network Relay. In step 1905, a remote UE is switched on. In step 1910, the remote UE performs a first relay UE discovery using a first RSC, wherein the first RSC is used specifically for relay UE discovery due to UE switch on or the first RSC is any of RSCs which are provisioned or (pre)configured to the remote UE and each of which is associated with a connectivity service. In step 1915, the remote UE selects a relay UE based on a discovery message received from the relay UE, wherein the discovery message includes the first RSC.

In one embodiment, the remote UE could establish a PC5 unicast link or a PC5 RRC connection with the relay UE using the first RSC. The remote UE could receive paging information for the remote UE via the relay UE after the PC5 unicast link or the PC5 RRC connection is established.

In one embodiment, the first RSC may be included in a Direct Communication Request message transmitted to the relay UE for establishing the PC5 unicast link. The first RSC may also be included in a UE-to-Network Relay Discovery Announcement message transmitted by the relay UE or a UE-to-Network Relay Discovery Solicitation message transmitted by the remote UE during the first relay UE discovery. The first RSC may be a default value, a predefined value, or configured by a network.

In one embodiment, the remote UE could transmit an identity of the remote UE and a UE specific DRX cycle to the relay UE. The relay UE may be a Layer-2 UE-to-Network Relay. The PC5 unicast link may be a Layer-2 link.

In one embodiment, the remote UE could initiate a registration procedure with a first network node via the relay UE after the PC5 unicast link or the PC5 RRC connection is established. There may be no connectivity service request from upper layers or an upper layer application in the remote UE before the remote UE performs the first relay UE discovery using the first RSC.

In one embodiment, the upper layers or the upper layer application in the remote UE could request a connectivity service. The remote UE could perform a second relay UE discovery by using a second RSC, wherein the second RSC is associated with the connectivity service. The remote UE could initiate a PDU session establishment procedure or establishes a PDU session for the connectivity service with a second network node via a second relay UE discovered during the second relay UE discovery.

In one embodiment, the first network node may be AMF. The second network node may be SMF or UPF. Each of the RSCs provisioned or (pre)configured to the remote UE could be offering layer-2 UE-to-Network relay communication.

Referring back to FIGS. 3 and 4, in one exemplary embodiment of a method for a remote UE, the remote UE 300 includes a program code 312 stored in the memory 310. The CPU 308 could execute program code 312 to enable the remote UE (i) to be switched on, (ii) to perform a first relay UE discovery using a first RSC, wherein the first RSC is used specifically for relay UE discovery due to UE switch on or the first RSC is any of RSCs which are provisioned or (pre)configured to the remote UE and each of which is associated with a connectivity service, and (iii) to select a relay UE based on a discovery message received from the relay UE, wherein the discovery message includes the first RSC. Furthermore, the CPU 308 can execute the program code 312 to perform all of the above-described actions and steps or others described herein.

Figure 20:
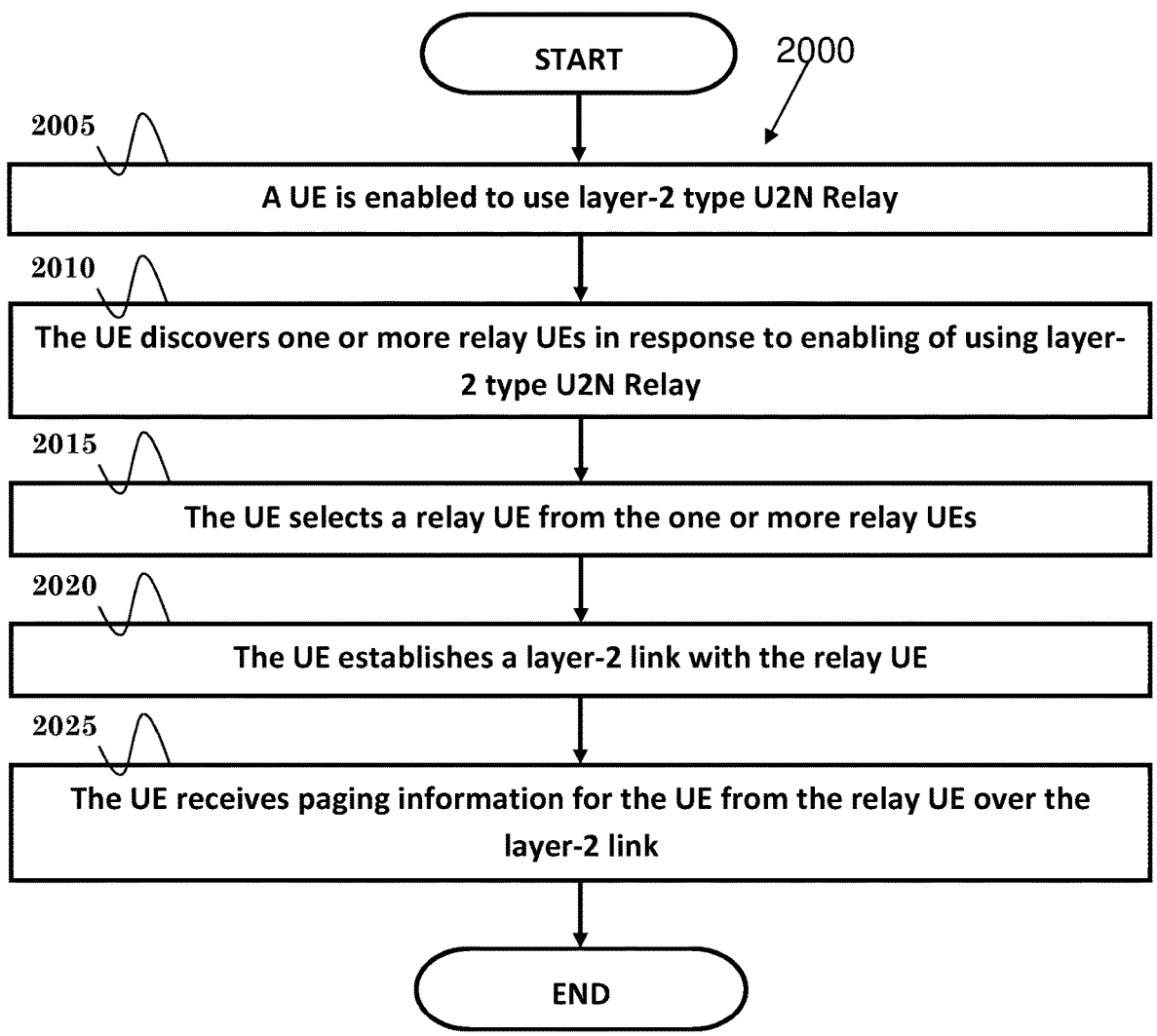
FIG. 20 is a flow chart according to one exemplary embodiment.

FIG. 20 is a flow chart 2000 for a method for paging reception via UE-to-Network Relay. In step 2005, a UE is enabled to use layer-2 type U2N Relay. In step 2010, the UE discovers one or more relay UEs in response to enabling of using layer-2 type U2N Relay. In step 2015, the UE selects a relay UE from the one or more relay UEs. In step 2020, the UE establishes a layer-2 link with the relay UE. In step 2025, the UE receives paging information for the UE from the relay UE over the layer-2 link.

In one embodiment, the one or more relay UEs broadcast discovery messages in which each discovery message could include one RSC offering layer-2 U2N Relay service. The UE has not initiated any connectivity service for relaying yet before the UE starts to discover the one or more relay UEs. The layer-2 link could be associated with a RSC, and the RSC indicates the relay UE offering layer-2 U2N Relay service.

In one embodiment, the UE could initiate a connectivity service for relaying after establishing the layer-2 link with the relay UE. The UE could initiate a PDU session establishment procedure or establishes a PDU session for the connectivity service with a network node via the relay UE. The UE could transfer traffic of the connectivity service between the UE and the network node via the relay UE over the layer-2 link.

In one embodiment, the network node could be a base station, an Access and Mobility Management Function (AMF), a Session Management Function (SMF), or a User Plane Function (UPF).

Referring back to FIGS. 3 and 4, in one exemplary embodiment of a method for a UE, the UE 300 includes a program code 312 stored in the memory 310. The CPU 308 could execute program code 312 to enable the UE (i) to be enabled to use layer-2 type U2N Relay, (ii) to discover one or more relay UEs in response to enabling of using layer-2 type U2N Relay, (iii) to select a relay UE from the one or more relay UEs, (iv) to establish a layer-2 link with the relay UE, and (v) to receive paging information for the UE from the relay UE over the layer-2 link. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for paging reception via User Equipment (UE)-to-Network Relay, comprising:
being, by a UE, enabled to use layer-2 UE-to-Network (U2N) Relay for supporting a mobile-terminating (MT) service;
discovering, by the UE, one or more relay UEs in response to being enabled to use layer-2 type U2N Relay for supporting the MT service;
selecting, by the UE, a relay UE from the one or more relay UEs;
establishing, by the UE, a layer-2 link with the relay UE; and
receiving, by the UE, paging information for the UE from the relay UE over the layer-2 link.

2. The method of claim 1, wherein the one or more relay UEs broadcast discovery messages in which each discovery message includes one Relay Service Code (RSC) offering layer-2 U2N Relay service.

3. The method of claim 1, wherein the UE has not initiated any connectivity service for relaying yet before the UE starts to discover the one or more relay UEs.

4. The method of claim 1, wherein the layer-2 link is associated with a RSC, and the RSC indicates the relay UE offering layer-2 U2N Relay service.

5. The method of claim 1, further comprising:
the UE initiates a connectivity service for relaying after establishing the layer-2 link with the relay UE.

6. The method of claim 5, further comprising:
the UE initiates a Protocol Data Unit (PDU) session establishment procedure or establishes a PDU session for the connectivity service with a network node via the relay UE.

7. The method of claim 6, further comprising:
the UE transfers traffic of the connectivity service between the UE and the network node via the relay UE over the layer-2 link.

8. The method of claim 6, wherein the network node is a base station, an Access and Mobility Management Function (AMF), a Session Management Function (SMF), or a User Plane Function (UPF).

9. A User Equipment (UE) for paging reception via UE-to-Network Relay, comprising:
a control circuit;
a processor installed in the control circuit; and
a memory installed in the control circuit and operatively coupled to the processor;
wherein the processor is configured to execute a program code stored in the memory to:
be enabled to use layer-2 UE-to-Network (U2N) Relay for supporting a mobile-terminating (MT) service;
discover one or more relay UEs in response to being enabled to use layer-2 U2N Relay for supporting the MT service;
select a relay UE from the one or more relay UEs;
establish a layer-2 link with the relay UE; and
receive paging information for the UE from the relay UE over the layer-2 link.

10. The UE of claim 9, wherein the one or more relay UEs broadcast discovery messages in which each discovery message includes one Relay Service Code (RSC) offering layer-2 U2N Relay service.

11. The UE of claim 9, wherein the UE has not initiated any connectivity service for relaying yet before the UE starts to discover the one or more relay UEs.

12. The UE of claim 9, wherein the layer-2 link is associated with a RSC, and the RSC indicates the relay UE offering layer-2 U2N Relay service.

13. The UE of claim 9, wherein the processor is further configured to execute a program code stored in the memory to:
initiate a connectivity service for relaying after establishing the layer-2 link with the relay UE.

14. The UE of claim 13, wherein the processor is further configured to execute a program code stored in the memory to:
initiate a Protocol Data Unit (PDU) session establishment procedure or establishes a PDU session for the connectivity service with a network node via the relay UE.

15. The UE of claim 14, further comprising:
the UE transfers traffic of the connectivity service between the UE and the network node via the relay UE over the layer-2 link.

16. The UE of claim 14, wherein the network node is a base station, an Access and Mobility Management Function (AMF), a Session Management Function (SMF), or a User Plane Function (UPF).

17. A method, comprising:
in response to a User Equipment (UE) being enabled to use layer-2 UE-to-Network (U2N) Relay for supporting a mobile-terminating (MT) service, discovering one or more relay UEs;
selecting a relay UE from the one or more relay UEs;

establishing a layer-2 link with the relay UE; and
receiving paging information for the UE from the relay UE over the layer-2 link.

18. The method of claim 17, wherein the one or more relay UEs broadcast discovery messages in which each discovery message includes one Relay Service Code (RSC) offering layer-2 U2N Relay service.

19. The method of claim 17, wherein the UE has not initiated any connectivity service for relaying yet before the UE starts to discover the one or more relay UEs.

20. The method of claim 17, wherein the layer-2 link is associated with a RSC, and the RSC indicates the relay UE offering layer-2 U2N Relay service.

* * * * *